United States Patent
Arai et al.

(10) Patent No.: US 6,912,117 B2
(45) Date of Patent: Jun. 28, 2005

(54) SOLID ELECTROLYTIC CAPACITOR AND METHOD OF MANUFACTURING THE SAME

(75) Inventors: Shinji Arai, Toyama (JP); Takahiro Kayamori, Toyama (JP)

(73) Assignees: NEC TOKIN Corporation, Sendai (JP); NEC TOKIN Toyama, Ltd., Toyama (JP)

( * ) Notice: Subject to any disclaimer, the term of this patent is extended or adjusted under 35 U.S.C. 154(b) by 28 days.

(21) Appl. No.: 10/742,412

(22) Filed: Dec. 19, 2003

(65) Prior Publication Data

US 2004/0165338 A1 Aug. 26, 2004

(30) Foreign Application Priority Data

Feb. 20, 2003 (JP) .......................................... 2003-042415

(51) Int. Cl.[7] .............................................. H01G 9/00
(52) U.S. Cl. ....................... 361/523; 361/528; 361/532; 361/541; 29/25.03
(58) Field of Search ................................ 361/523–525, 361/528–529, 531–533, 541; 29/25.03

(56) References Cited

U.S. PATENT DOCUMENTS 5,478,965 A  * 12/1995 Hashiba ...................... 29/25.03
5,638,253 A  * 6/1997 Hasegawa .................... 361/535
6,535,375 B1 * 3/2003 Jung et al. ................... 361/523

FOREIGN PATENT DOCUMENTS

| JP | 2921242 B2 | 4/1999 |
| JP | 2002-75807 A | 3/2002 |
| JP | 2002-335107 A | 11/2002 |

* cited by examiner

*Primary Examiner*—Anthony Dinkins
(74) *Attorney, Agent, or Firm*—Frishauf, Holtz, Goodman & Chick, P.C.

(57) ABSTRACT

A solid electrolytic capacitor having at least two capacitor elements using a valve action metal, such as tantalum or niobium, and laminated in a direction perpendicular to a mounting surface of a substrate. The capacitor elements have a width parallel to the mounting surface of the substrate greater than a thickness perpendicular to the mounting surface of the substrate, and an anode terminal is connected with anode leads led out to at least one side of an anode body made of the valve action metal generally in parallel to the mounting surface of the substrate. A cathode layer on a dielectric oxide film of the anode body is connected to a cathode terminal and is coated with exterior coating resin with a part of the anode terminal and a part of the cathode terminal exposed.

38 Claims, 27 Drawing Sheets

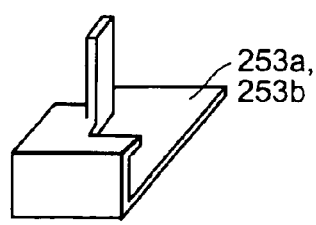

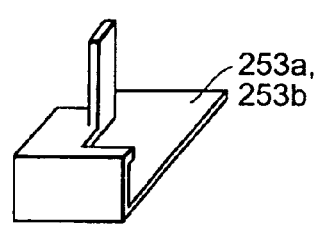

SOLID ELECTROLYTIC CAPACITOR AND METHOD OF MANUFACTURING THE SAME

The present application claims priority to prior Japanese application JP 2003-42415, the disclosure of which is incorporated herein by reference.

BACKGROUND OF THE INVENTION

The present invention relates to a solid electrolytic capacitor and a method of manufacturing the same.

Conventionally, a solid electrolytic capacitor, manufactured with the use of tantalum or the like for a valve action metal, has been used for a power supply circuit of a CPU since it is compact and has a large capacitance and a superior frequency characteristic.

Recently, there has been a demand for further improving the frequency characteristic. Therefore, a solid electrolytic capacitor with a conductive polymer used for a cathode layer has been developed against the conventional solid electrolytic capacitor with manganese dioxide used for a cathode layer. Thereby, an equivalent series resistance (hereinafter, referred to as ESR) has been improved and reduced to less than or equal to one-tenth of the conventional one.

With the increase of the CPU operating frequencies in recent years, however, there have increased demands for improving noise characteristics of the power supply circuits of the CPUs or for supplying a large permissible ripple current. Thereby, a capacitor having a still lower ESR characteristic has been needed.

Moreover, since apparatuses having the CPUs as mentioned above are being developed for downsizing and more advanced functions, it has become necessary to achieve a capacitor satisfying the requirements for a still lower ESR, a compact size, a large capacity, and a thin type.

When a plurality of capacitors are connected in parallel, a total capacitance $C_{total}$ and a total equivalent series resistance $ESR_{total}$ can be expressed in equation forms as:

$$C_{total} = C1 + C2 + \ldots + Cn \quad (1)$$

and $$1/ESR_{total} = 1/ESR1 + 1/ESR2 + \ldots + 1/ESRn \quad (2)$$

where Ci is a capacitance of the i-th (i=1 to n) capacitor and ESRi is an equivalent series resistance.

Therefore, if a plurality of elements can be connected in parallel within a required cubical configuration as mentioned above, it is possible to increase the capacity and to reduce the ESR. It is the same as in forming a solid electrolytic capacitor as a transmission-line noise filter.

There has been disclosed a conventional technology for reducing an ESR by connecting a plurality of capacitor elements in parallel, for example, in Japanese Unexamined Patent Publication (JP-A) No. 2002-75807. The first conventional technology has a structure shown in FIG. 1. Referring to FIG. 1, there are shown a capacitor element 201, an anode lead-out wire 202, an anode comb terminal 204, and a hoop material 208.

Furthermore, there has been disclosed a solid electrolytic capacitor having anode leads penetrating through the inside thereof and available as a transmission-line noise filter having a low impedance, for example, in Japanese Patent (JP-B) No. 2921242. The solid electrolytic capacitor as the second conventional technology is shown in FIG. 2. Referring to FIG. 2, there are shown an anode lead 281, an anode lead terminal 283, an anode body 284, and a cathode lead terminal 285.

When a plurality of capacitor elements are connected in parallel to achieve a low ESR, the ESRs of the individual capacitor elements are preferably as low as possible. In this case, a capacitor element having a larger external surface area achieves a lower ESR due to a skin effect in a high frequency domain such as, for example, exceeding 100 kHz on condition that the capacitor elements have the same volume.

Therefore, a thin-type element is needed as a requirement for designing the capacitor element (Width W>Thickness T). If elements each having the configuration are put in a horizontal direction on the anode terminal as in the first conventional technology, a resultant element has a large dimension in the height direction, thereby not satisfying the demand for the thin-type element.

Furthermore, it becomes hard to achieve a mold package size such as 7.3 mm×4.3 mm×2.8 mm or 7.3 mm×4.3 mm×1.9 mm, which are generally used.

Still further, it is hard to achieve both of a low ESR and dimensions of a thin type also when the capacitor element is used as a transmission-line noise filter.

SUMMARY OF THE INVENTION

It is an object of the present invention to provide a solid electrolytic capacitor having a low ESR and a large capacity in a high frequency domain, a thin-type external appearance, and a terminal structure superior in productivity and a method of manufacturing the same.

According to one aspect of the present invention, there is provided a solid electrolytic capacitor comprising at least two capacitor elements using a valve action metal and laminated in a direction perpendicular to a mounting surface of the substrate, wherein the capacitor elements have a width parallel to the mounting surface of the substrate greater than a thickness perpendicular to the mounting surface of the substrate and an anode terminal is connected with anode leads led out to at least one side of an anode body made of the valve action metal generally in parallel to the mounting surface of the substrate; and wherein a cathode layer on a dielectric oxide film of the anode body is connected to a cathode terminal and is coated with exterior coating resin with a part of the anode terminal and a part of the cathode terminal exposed.

Preferably, the valve action metal is tantalum or niobium.

Preferably, the capacitor elements have anode leads led out from one side of the anode body made of the valve action metal and the anode leads can be connected to a single anode terminal.

Preferably, the capacitor elements have anode leads penetrating through the anode body made of the valve action metal and both ends of the anode leads can be connected to independent anode terminals.

Furthermore, an anode connecting piece can be welded between the anode terminal and the plurality of anode leads.

The anode connecting piece can be L-shaped. The anode connecting piece can be horseshoe-shaped. The anode connecting piece can have rectangular portions having different lengths at both ends of three rectangular portions forming the horseshoe shape.

Furthermore, the anode connecting piece can have one of the rectangular portions at both ends further bent outwardly at an angle of 90 degrees among the three rectangular portions formed by bending a strip into a horseshoe shape.

Still further, the anode connecting piece can have a twofold portion formed by bending the strip in the center at an angle of 90 degrees, 180 degrees, and 90 degrees again in this order.

The anode terminal can be bent, at one side of the end portion inside the exterior coating resin, at an angle of 90 degrees around a bending line parallel to the anode leads.

In the solid electrolytic capacitor of the present invention, the anode leads can be led out to one side of the anode body and directly welded to the anode terminal.

The anode leads can be led out to one side of the anode body, and the anode terminal can be planar inside the exterior coating resin, bent along a surface of the exterior coating resin in a bottom face, which is the mounting surface of the substrate, and further bent along a surface of the exterior coating resin in a side face, which is an external surface substantially perpendicular to the lead-out direction of the anode leads.

Furthermore, the anode leads can be led out to one side of the anode body, and the anode terminal can be bent to an angle of substantially 90 degrees along a bending line parallel to the lead-out direction of the anode leads inside the exterior coating resin, bent along a surface of the exterior coating resin in a side face, which is an external surface substantially perpendicular to the lead-out direction of the anode leads, and further bent along a surface of the exterior coating resin in the bottom face, which is the mounting surface of the substrate.

Still further, the anode leads can be led out to one side of the anode body, and the cathode terminal can be connected to the cathode layer in a front or rear face of the capacitor elements, parallel to the lead-out direction of the anode leads of the capacitor elements and substantially perpendicular to a bottom face and further in an end face substantially perpendicular to the lead-out direction of the anode leads and opposed to the anode leads.

The anode leads can be led out to one side of the anode body, and the cathode terminal can be connected to the capacitor elements in the front or rear face and the bottom face of the capacitor elements.

Preferably, the solid electrolytic capacitor according to the present invention has anode leads penetrating through the anode body. The anode leads can be directly welded to the anode terminal.

Furthermore, the anode leads can penetrate through the anode body. In addition, the anode terminal can be planar inside the exterior coating resin, bent along a surface of the exterior coating resin in a bottom face, which is the mounting surface of the substrate, and further bent along a surface of the exterior coating resin in a side face, which is an external surface substantially perpendicular to the lead-out direction of the anode leads.

Furthermore, the anode leads can penetrate through the anode body. In addition, the anode terminal can be bent to an angle of substantially 90 degrees along the bending line parallel to the lead-out direction of the anode leads inside the exterior coating resin, bent along a surface of the exterior coating resin in the bottom face, which is the mounting surface of the substrate, and further bent along a surface of the exterior coating resin in the side face, which is an external surface substantially perpendicular to the lead-out direction of the anode leads.

Still further, the anode leads can penetrate through the anode body, while the cathode terminal can be connected to the cathode layer in the front or rear face of the capacitor elements and in the bottom face of one of the capacitor elements.

The anode leads can penetrate the anode body, while the cathode terminal can be connected to the cathode layer in a top face of one of the capacitor elements.

The anode leads can penetrate through the anode body, while the cathode terminal can be connected to the cathode layer in a bottom face of one of the capacitor elements.

In accordance with another aspect of the present invention, there is provided a method of manufacturing a solid electrolytic capacitor, in which anode leads are led out from an anode body made of a valve action metal and in which capacitor elements with a cathode layer formed on a dielectric oxide film of the anode body are laminated in a direction perpendicular to a mounting surface of a substrate and electrically connected in parallel, the method comprising the steps of: forming a cathode terminal forming section of a lead frame; providing a plurality of capacitor elements in a parallel arrangement in a way that a bottom face to be parallel to a mounting surface of a substrate at mounting is perpendicular to a surface of the lead frame, welding the anode leads of the capacitor elements to the anode terminal forming section of the lead frame, and connecting the cathode layer to the cathode terminal forming section; molding the capacitor elements connected in the parallel arrangement in exterior coating resin; cutting and separating the molded body from the lead frame; and bending the anode terminal and the cathode terminal separated from the lead frame at an angle of 90 degrees along the exterior coating resin in the side face and the bottom face for formation.

Preferably, the valve action metal is tantalum or niobium.

DESCRIPTION OF THE PREFERRED EMBODIMENTS

The preferred embodiments of the present invention will now be described hereinafter with reference to the accompanying drawings.

Figure 1:
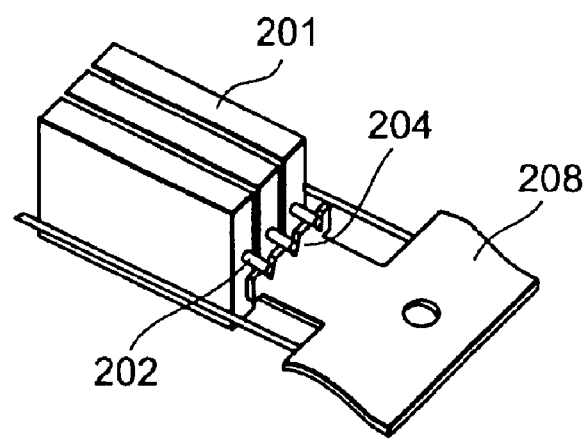
FIG. 1 is a perspective view of a conventional solid electrolytic capacitor.
Figure 2:
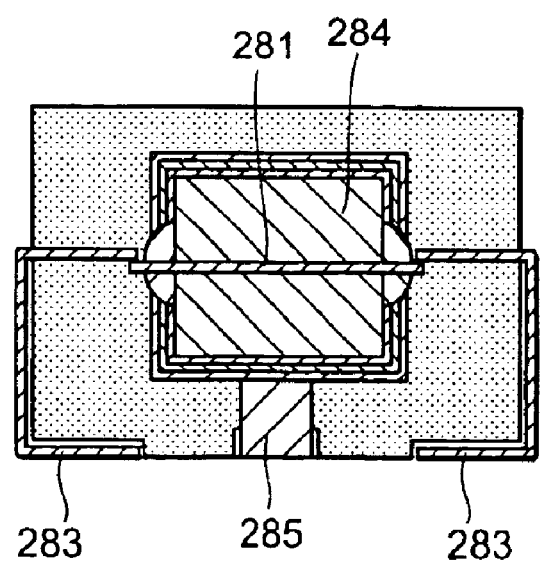
FIG. 2 is a cross section of another conventional solid electrolytic capacitor.
Figure 3A:
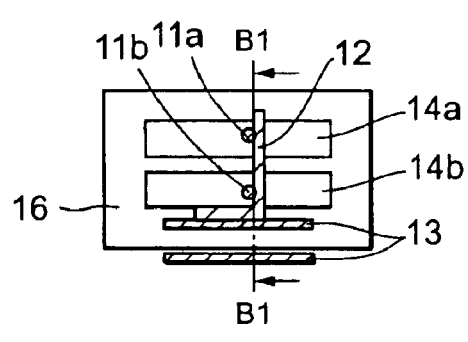
FIG. 3A is a cross-sectional view taken on line A1—A1 of FIG. 3B, showing a solid electrolytic capacitor according to a first embodiment.
Figure 3B:
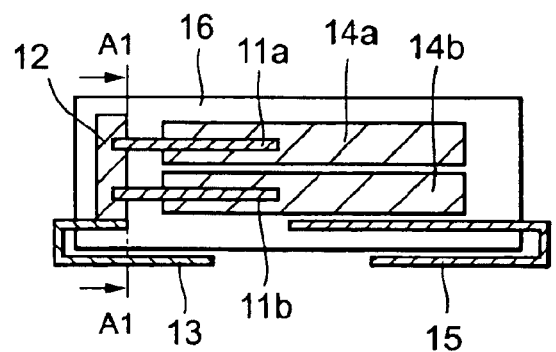
FIG. 3B is a cross-sectional view taken on line B1—B1 of FIG. 3A.
Figure 3C:
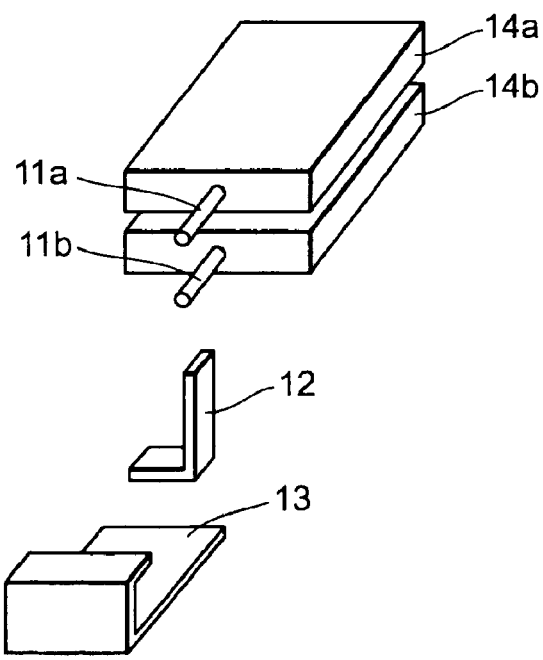
FIG. 3C is a partial exploded diagram shown by means of a perspective view of the solid electrolytic capacitor according to the first embodiment.

Referring to FIG. 3, there is shown a solid electrolytic capacitor according to a first embodiment of the present invention. FIG. 3A, FIG. 3B, and FIG. 3C are a cross-sectional view taken on line A1—A1, a cross-sectional view taken on line B1—B1, and a partial exploded diagram shown by means of a perspective view, respectively. While cut areas are indicated by hatching in the cross sections, portions on the other side of exterior coating resin are shown as if the exterior coating resin were transparent.

There are shown anode leads 11a and 11b, an anode connecting piece 12, an anode terminal 13, capacitor elements 14a and 14b, a cathode terminal 15, and exterior coating resin 16.

First, the capacitor elements are described below. The capacitor elements 14a and 14b are in the thin-type pellet shape, thereby reducing an ESR of a single capacitor element. In other words, an ESR value depends upon a skin effect in a high frequency domain exceeding 100 kHz, and therefore the thin type is effective to reduce an increase of the ESR value.

The capacitor element is manufactured as described below. With the use of a so-called valve action metal, such as tantalum or niobium, having a valve action, a sintered compact of the same metal powders is formed around an anode lead, which is the same metal wire to make an anode body. A dielectric oxide film is formed on the anode body and a solid electrolyte made of a conductive polymer is formed on it. A graphite layer and a silver paste layer are then formed further.

The resultant capacitor elements are stacked so as to be laminate in a vertical direction, more specifically, in a direction perpendicular to a mounting surface of a substrate or a bottom face.

The anode connecting piece 12, which is an L-shaped strip as shown in FIG. 3C, is welded to the anode leads 11a and 11b of a wire type by laser or resistance welding. Furthermore, the anode connecting piece 12 is welded to the anode terminal 13 of a bent strip type, too.

On the other hand, a cathode layer is connected to the cathode terminal 15 of a bent strip type by conductive adhesive in a bottom face of the capacitor element 14b. Moreover, a bottom face of the capacitor element 14a is bonded to a top face of the capacitor element 14b by conductive adhesive.

In addition, the anode terminal 13 and the cathode terminal 15 are coated with the exterior coating resin 16 with the bottom face and the side face exposed.

With the laminate structure and the terminal structure, the ESR was successfully reduced to one-half of an ESR value of a single capacitor element, and a solid electrolytic capacitor having twice the capacitance of the conventional one was achieved.

Although the conductive polymer is used for the cathode layer in the first embodiment, it is also possible to reduce the ESR to one-half of the value of the single capacitor element and to achieve a solid electrolytic capacitor having twice the capacitance of the conventional one by using a cathode layer of manganese dioxide ($MnO_2$), graphite, or silver (Ag) paste.

Furthermore, when using three or more capacitance elements, the ESR can be reduced to a value equal to one divided by the number of the capacitor elements and to achieve a solid electrolytic capacitor having a capacitance multiplied by the number of the capacitor elements.

Figure 4A:
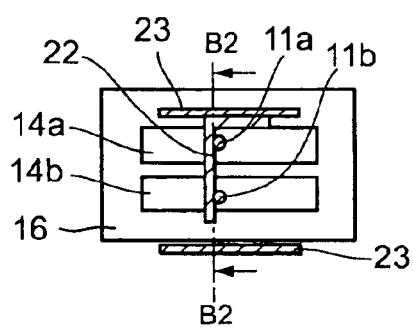
FIG. 4A is a cross-sectional view taken on line A2—A2 of FIG. 4B, showing a solid electrolytic capacitor according to a second embodiment.
Figure 4B:
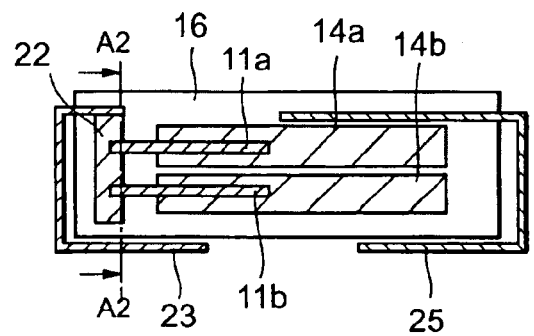
FIG. 4B is a cross-sectional view taken on line B2—B2 of FIG. 4A.
Figure 4C:
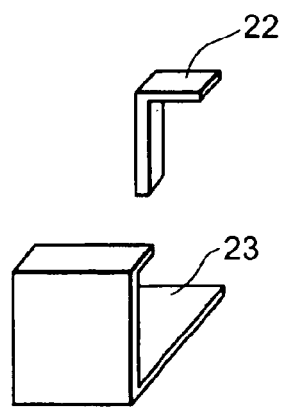
FIG. 4C is a partial exploded diagram shown by means of a perspective view of the solid electrolytic capacitor according to the second embodiment.

Referring to FIG. 4, there is shown a solid electrolytic capacitor according to a second embodiment of the present invention. FIG. 4A, FIG. 4B, and FIG. 4C are a cross-sectional view taken on line A2—A2, a cross-sectional view taken on line B2—B2, and a partial exploded diagram shown by means of a perspective view, respectively.

There are shown an anode connecting piece 22, an anode terminal 23, and a cathode terminal 25. Other reference numerals are the same as in FIG. 3.

In the second embodiment, the anode connecting piece 22, the anode terminal 23, and the cathode terminal 25 differ from those in the first embodiment in the shapes, while others are substantially the same as the first embodiment.

The anode connecting piece 22, which is an L-shaped strip as shown in FIG. 4C, is welded to the anode leads 11a and 11b of a wire type by laser or resistance welding. Furthermore, the anode connecting piece 22 is welded to the anode terminal 23 of a bent strip type, too.

On the other hand, a cathode layer is connected to the cathode terminal 25 of a bent strip type by conductive adhesive on the top face of the capacitor element 14a.

Moreover, the anode terminal 23 and the cathode terminal 25 are coated with exterior coating resin 16 with the bottom face and the side face exposed.

In the second embodiment, a laterally exposed area of the anode terminal and that of the cathode terminal are larger than those of the first embodiment.

With the laminate structure and the terminal structure, the ESR was successfully reduced to one-half of an ESR value of the single capacitor element and a solid electrolytic capacitor having twice the capacitance of the conventional one was achieved, too.

Figure 5A:
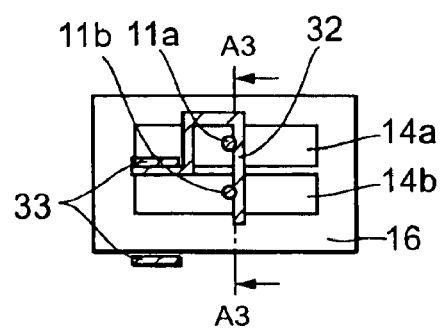
FIG. 5A is a cross-sectional view taken on line B3—B3 of FIG. 5B, showing a solid electrolytic capacitor according to a third embodiment.
Figure 5B:
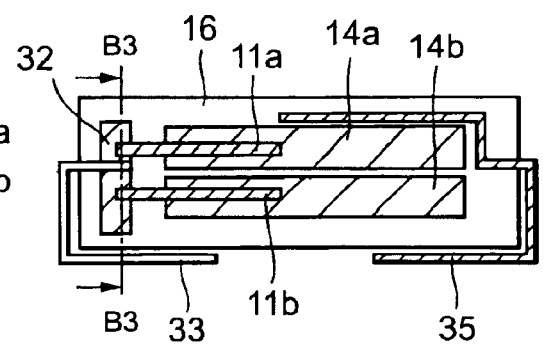
FIG. 5B is a cross-sectional view taken on line A3—A3 of FIG. 5A.
Figure 5C:
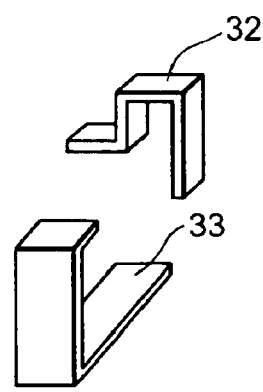
FIG. 5C is a partial exploded diagram shown by means of a perspective view of the solid electrolytic capacitor according to the third embodiment.

Referring to FIG. 5, there is shown a first solid electrolytic capacitor according to a third embodiment of the present invention. FIG. 5A, FIG. 5B, and FIG. 5C are a cross-sectional view taken on line A3—A3, a cross-sectional view taken on line B3—B3, and a partial exploded diagram shown by means of a perspective view, respectively.

There are shown an anode connecting piece 32, an anode terminal 33, and a cathode terminal 35. Other reference numerals are the same as in FIG. 3 and FIG. 4.

In the third embodiment, the anode connecting piece 32, the anode terminal 33, and the cathode terminal 35 differ from those of the first embodiment and the second embodiment in the shapes, while others are substantially the same as these embodiments.

The anode connecting piece 32 in the bent shape as shown in FIG. 5C (the shape in which one of rectangular portions at both ends is further bent outwardly at an angle of 90 degrees among three rectangular portions formed by a strip bent into a horseshoe shape) is welded to anode leads 11a and 11b of a wire type by laser or resistance welding. Furthermore, the anode connecting piece 32 is welded to the anode terminal 33 of a bent strip type, too.

On the other hand, a cathode layer is connected to the cathode terminal 35 of a bent strip type by conductive adhesive on the top face of the capacitor element 14a.

Moreover, the anode terminal 33 and the cathode terminal 35 are coated with exterior coating resin 16 with the bottom face and the side face exposed.

Figure 6A:
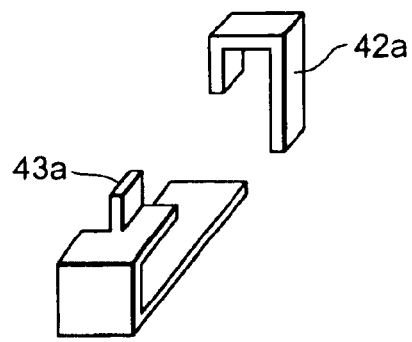
FIGS. 6A and 6D are perspective views showing an anode connecting piece and an anode terminal of second to fifth solid electrolytic capacitors according to the third embodiment.
Figure 6B:
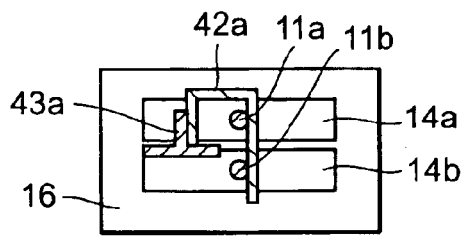
FIGS. 6B, 6C, 6E, and 6F are cross sections showing an anode weld.
Figure 6C:
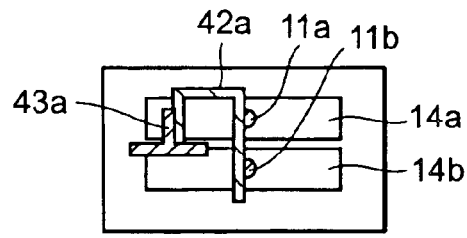

Referring to FIG. 6A, there is shown a perspective view of an anode connecting piece 42a and an anode terminal 43a each having another shape in the third embodiment. Referring to FIG. 6B and FIG. 6C, there are shown schematic diagrams of anode welds of a solid electrolytic capacitor having the anode connecting piece 42a and the anode terminal 43a shown in FIG. 6A.

Figure 6D:
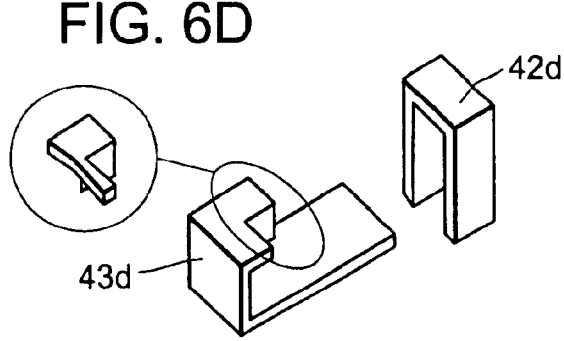
Figure 6E:
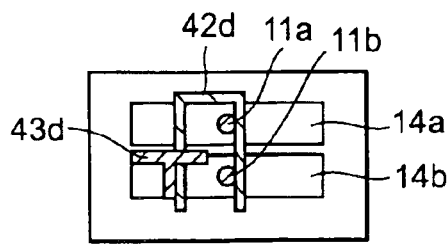
Figure 6F:
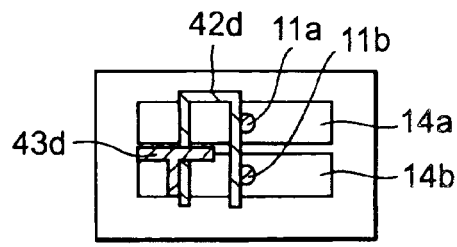
Figure 7A:
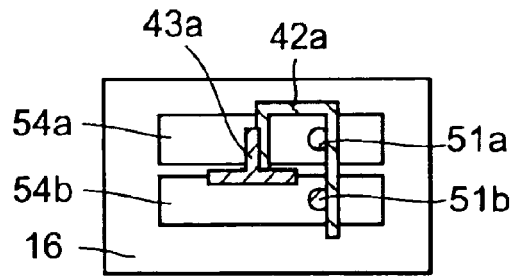
FIGS. 7A, 7B, 7C, and 7D are cross-sectional view showing an anode weld of sixth to ninth solid electrolytic capacitors according to the third embodiment.
Figure 7B:
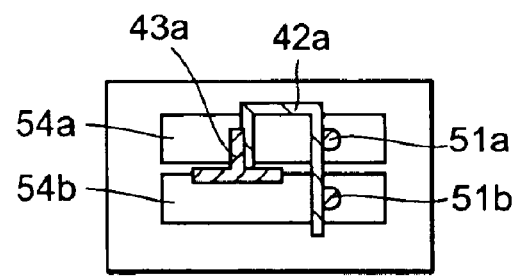
Figure 7C:
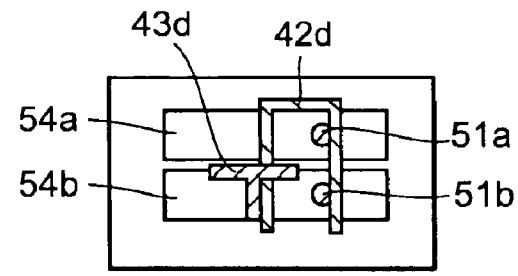
Figure 7D:
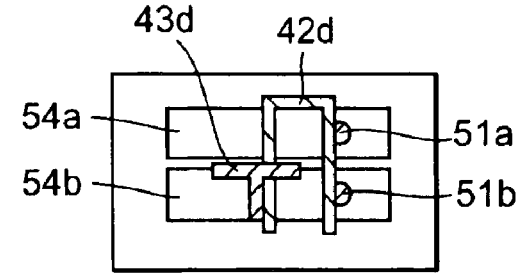

Referring to FIG. 6D, there is shown a perspective view of an anode connecting piece 42d and an anode terminal 43d each having still another shape (horseshoe shape) in the third embodiment. Referring to FIG. 6E and FIG. 6F, there are shown schematic diagrams of anode welds of a solid electrolytic capacitor having the anode connecting piece 42d and the anode terminal 43d shown in FIG. 6D.

Referring to FIG. 7, there are shown schematic diagrams of anode welds in the case of using capacitor elements having anode leads led out to be eccentric away from the center of the capacitor elements. Referring to FIG. 7A and FIG. 7B, there are shown the diagrams in the case of using the anode connecting piece and the anode terminal shown in FIG. 6A. Referring to FIG. 7C and FIG. 7D, there are shown the diagrams in the case of using the anode connecting piece and the anode terminal shown in FIG. 6D. Reference numerals 51a and 51b designate anode leads and reference numerals 54a and 54b designate capacitor elements. Note that FIGS. 6B, 6C, 6E, 6F, 7A, 7B, 7C, and 7D show only the anode welds, not showing the anode terminals outside the exterior coating resin.

With the laminate structure and the terminal structure, the ESR was successfully reduced to one-half of an ESR value of the single capacitor element and a solid electrolytic capacitor having twice the capacitance of the conventional one was achieved, too.

Figure 8A:
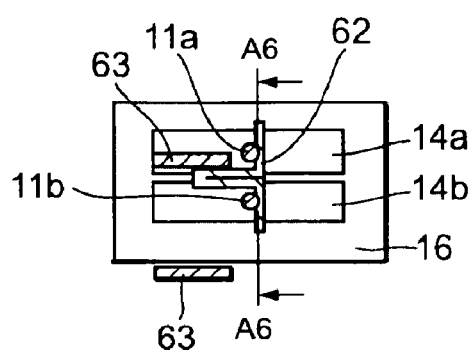
FIG. 8A is a cross-sectional view taken on line B6—B6 of FIG. 8B, showing a first solid electrolytic capacitor according to a fourth embodiment.
Figure 8B:
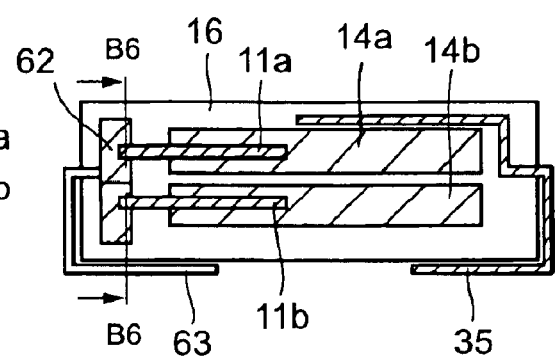
FIG. 8B is a cross-sectional view taken on line A6—A6 of FIG. 8A.
Figure 8C:
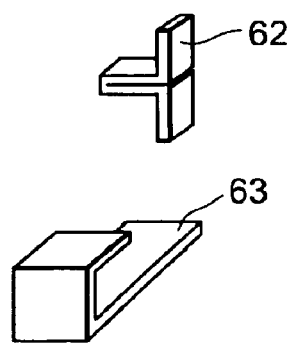
FIG. 8C is a partial exploded diagram shown by means of a perspective view of the solid electrolytic capacitor.

Referring to FIG. 8, there is shown a first solid electrolytic capacitor according to a fourth embodiment of the present invention. FIG. 8A, FIG. 8B, and FIG. 8C are a cross-sectional view taken on line A6—A6, a cross-sectional view taken on line B6—B6, and a partial exploded diagram shown by means of a perspective view, respectively.

In FIG. 8, there are shown an anode connecting piece 62, an anode terminal 63, and a cathode terminal 35. Other reference numerals are the same as in other drawings.

In the fourth embodiment, the anode connecting piece 62 and the anode terminal 63 differ from other embodiments in the shapes.

The anode connecting piece 62 in the bent shape as shown in FIG. 8C (the shape with a twofold portion formed by bending the strip in the center at an angle of 90 degrees, 180 degrees, and 90 degrees again in this order) is welded to anode leads 11a and 11b of a wire type by laser or resistance welding. Furthermore, the anode connecting piece 62 is welded to the anode terminal 63 of a bent strip type, too.

On the other hand, a cathode layer is connected to the cathode terminal 35 of a bent strip type by conductive adhesive on the top face of the capacitor element 14a.

Referring to FIG. 9, there are shown schematic diagrams of anode welds of second to fourth solid electrolytic capacitors according to the fourth embodiment, in the case of using capacitor elements having anode leads led out to be eccentric away from the center of the capacitor elements.

Figure 9A:
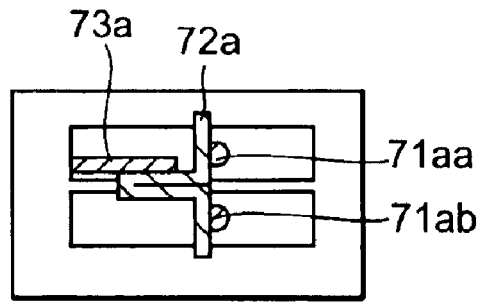
FIG. 9A is a schematic diagram showing a second anode weld in second to fourth solid electrolytic capacitors according to the fourth embodiment.

In a second anode weld shown in FIG. 9A, an anode terminal 73a has the same shape as the anode terminal 63 (See FIG. 8) and an anode connecting piece 72a has the same shape as the anode connecting piece 62 (See FIG. 8), while anode leads 71aa and 71ab and welding portions differ from those in FIG. 8 in the structure.

Figure 9B:
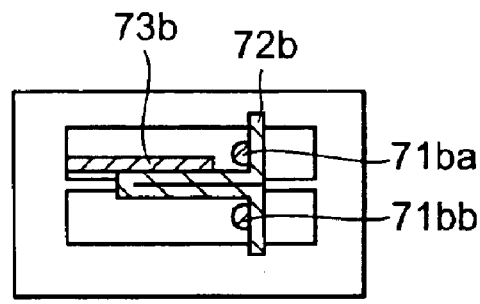
FIG. 9B is a schematic diagram showing a third anode weld.

In a third anode weld shown in FIG. 9B, an anode terminal 73b differs from the anode terminal 63 (See FIG. 8) in the dimensions, an anode connecting piece 72b differs from the anode terminal 62 (See FIG. 8) in the dimensions, and anode leads 71ba and 71bb are eccentric away from the center of the capacitor elements and thus the welding portions differ from those in FIG. 8 in the structure.

Figure 9C:
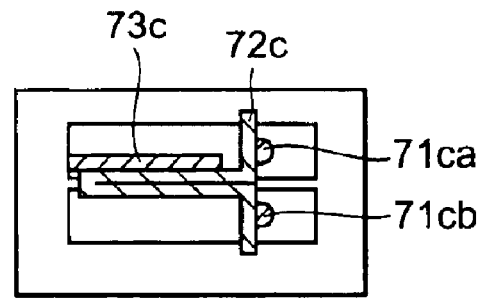
FIG. 9C is a schematic diagram showing a fourth anode weld.
Figure 10A:
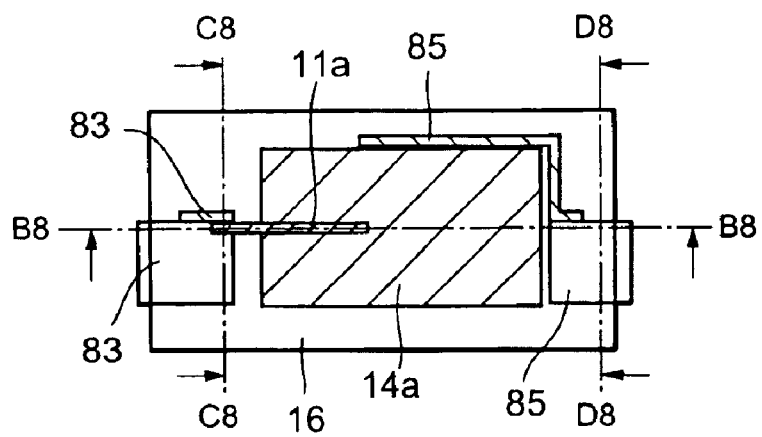
FIG. 10A is a cross-sectional view taken on line A8—A8 of FIG. 10B, showing a solid electrolytic capacitor according to a fifth embodiment.
Figure 10B:
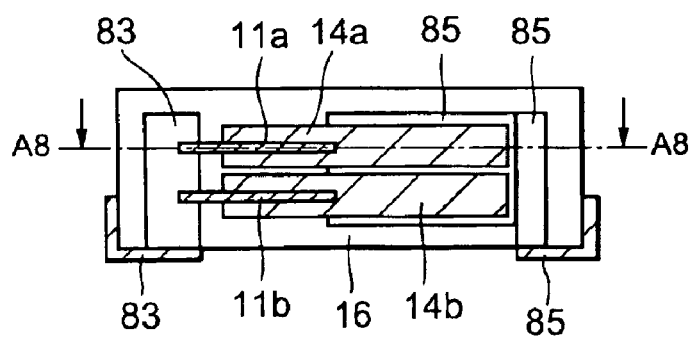
FIG. 10B is a cross-sectional view taken on line B8—B8 of FIG. 10A.
Figure 10C:
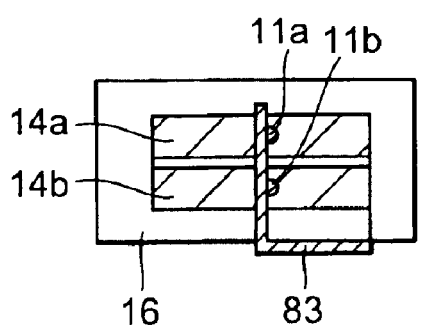
FIG. 10C is a cross-sectional view taken on ling C8—C8 of FIG. 10A.
Figure 10D:
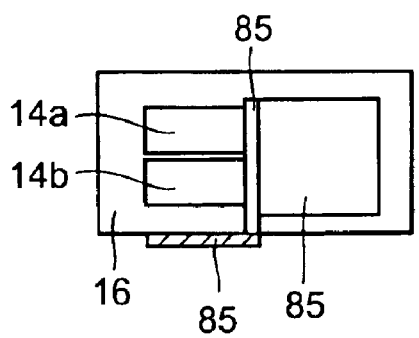
FIG. 10D is a cross-sectional view taken on line D8—D8 of FIG. 10A.

In a fourth anode weld shown in FIG. 9C, an anode terminal 73c differs from the anode terminal 63 (See FIG. 8) in the dimensions, an anode connecting piece 72c differs from the anode terminal 62 (See FIG. 8) in the dimensions, and anode leads 71ca and 71cb are eccentric away from the center of the capacitor elements and thus the welding portions differ from those in FIG. 8 in the structure.

In the fourth embodiment, the ESR was successfully reduced to one-half of an ESR value of the single capacitor element and a solid electrolytic capacitor having twice the capacitance of the conventional one was achieved, too.

Referring to FIG. 10, there is shown a solid electrolytic capacitor according to a fifth embodiment. FIG. 10A, FIG. 10B, FIG. 10C, and FIG. 10D are a cross-sectional view taken on line A8—A8, a cross-sectional view taken on line B8—B8, a cross-sectional view taken on line C8—C8, and a cross-sectional view taken on line D8—D8, respectively.

In FIG. 10, there are shown an anode terminal 83 and a cathode terminal 85.

Figure 11A:
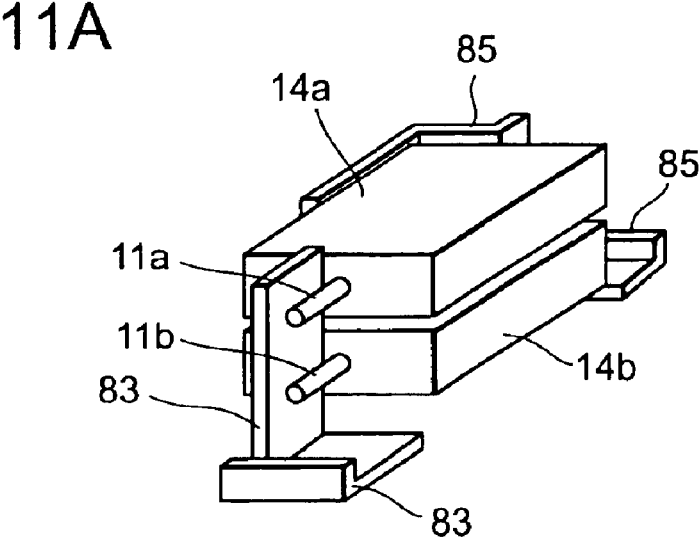
FIG. 11A is a perspective view of the solid electrolytic capacitor according to the fifth embodiment, viewed from the anode terminal side.
Figure 11B:
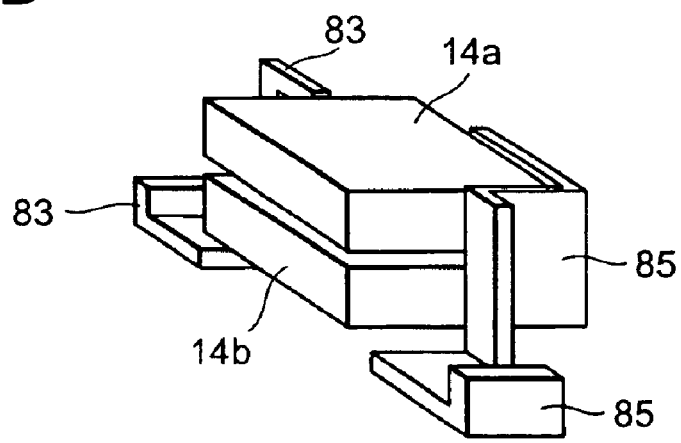
FIG. 11B is a perspective view of the solid electrolytic capacitor according to the fifth embodiment, viewed from the cathode terminal side.
Figure 11C:
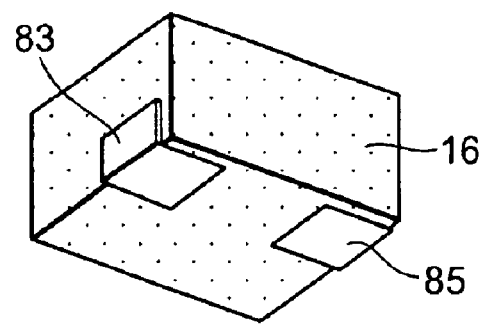
FIG. 11C is a perspective view of the solid electrolytic capacitor according to the fifth embodiment, viewed from below.

The solid electrolytic capacitor can be illustrated by schematic perspective views as in FIG. 11. In other words, FIG. 11 shows perspective views of the solid electrolytic capacitor of the fifth embodiment. Referring to FIGS. 11A, 11B, and 11C, there are shown a perspective diagram viewed from the anode terminal side, a perspective diagram viewed from the cathode terminal side, and a perspective diagram viewed from below. Note that, however, exterior coating resin is omitted in FIGS. 11A and 11B.

In the fifth embodiment, an anode terminal 83 is directly welded to anode leads 11a and 11b. A cathode terminal 85 is connected and fixed to the cathode layer by conductive adhesive in a rear face (one of the faces parallel to the lead-out direction of the anode leads of the capacitor elements and perpendicular to a bottom face thereof and an end face (a face perpendicular to the lead-out direction of the anode leads and opposed to the anode leads) of the capacitor elements 14a and 14b.

The following describes a method of manufacturing the solid electrolytic capacitor according to the fifth embodiment. A process of making the capacitor elements is the same as in the first embodiment.

Figure 12A:
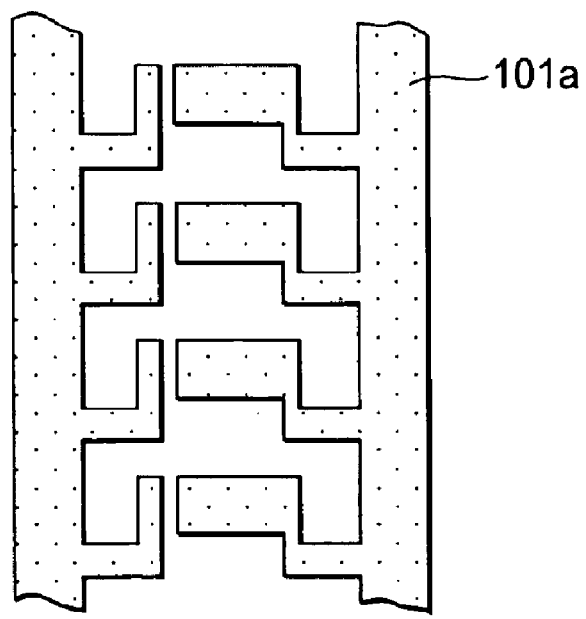
FIG. 12A is a top plan view of a lead frame not having been formed yet in the fifth embodiment.
Figure 12B:
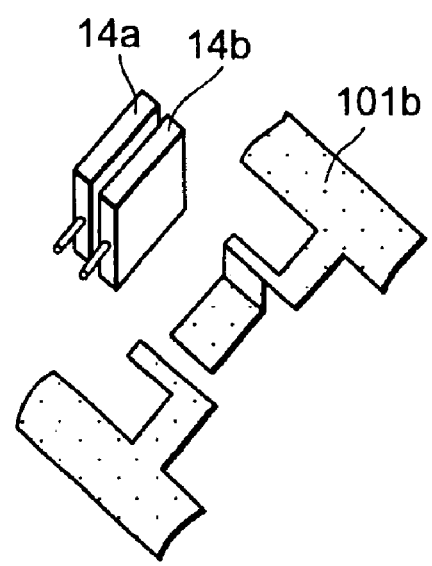
FIG. 12B is an exploded perspective view of a connection between a formed lead frame and a capacitor element.
Figure 13A:
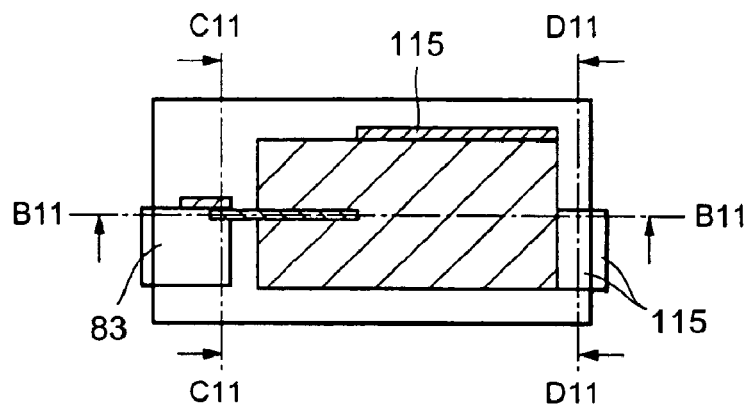
FIG. 13A is a cross-sectional view taken on line A11—A11 of FIG. 13B, showing a solid electrolytic capacitor according to a sixth embodiment.
Figure 13B:
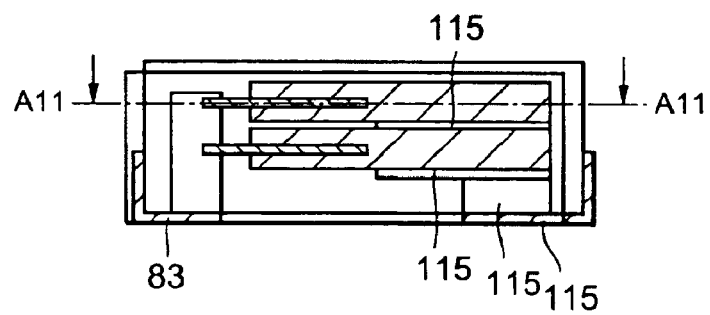
FIG. 13B is a cross-sectional view taken on line B11—B11 of FIG. 13A.
Figure 13C:
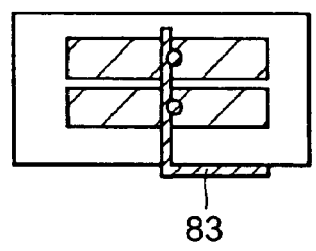
FIG. 13C is a cross-sectional view taken on line C11—C11 of FIG. 13A.
Figure 13D:
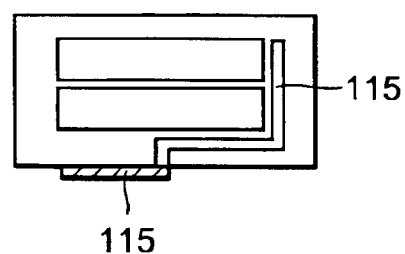
FIG. 13D is a cross-sectional view taken on line D11—D11 of FIG. 13A.

Referring now to FIG. 12, there are shown diagrams for explaining how the capacitor elements are connected to a lead frame. FIG. 12A is a top plan view of the lead frame. FIG. 12B is an exploded perspective view of a connection between the capacitor elements and the formed lead frame.

First, before connecting and fixing the obtained capacitor elements to the lead frame, a lead frame 101 a shown in FIG. 12A is formed into a shape of a lead frame 101b shown in FIG. 12B. Then, the capacitor elements 14a and 14b are provided in a parallel arrangement sidewardly in a way that their thickness direction is a horizontal direction, thereafter connecting and fixing the anode leads by welding and a cathode layer by a conductive adhesive.

The capacitor elements are molded in exterior coating resin, and the molded body is cut and separated from the lead frame.

Subsequently, the anode terminal and the cathode terminal separated from the lead frame are bent at an angle of 90 degrees so as to be along a surface to be a bottom face of the exterior coating resin 16 so that they are shaped into the forms as shown in FIG. 10 and FIG. 11. Moreover, each of them is further bent at an angle of 90 degrees so as to along a surface to be a side face of the exterior coating resin 16 to form a fillet. More specifically, an area between the first and second 90-deg bending boundaries exists in the bottom face, and an area from the second bending boundary to the end portion forms a fillet. As a result, when mounted on the substrate, these two capacitor elements are laminated in a direction perpendicular to the mounting surface of the substrate.

In the fifth embodiment, a terminal structure is provided without any anode connecting piece and it is easy to form the lead frame and to connect and fix the capacitor elements and further easy to form the terminals after they are cut and separated from the lead frame, thereby achieving a solid electrolytic capacitor superior in productivity and a method of manufacturing the same.

Referring to FIG. 13, there is shown a solid electrolytic capacitor according to a sixth embodiment. Referring to FIGS. 13A, 13B, 13C, and 13D, there are shown a cross-sectional view taken on line A11—A11, a cross-sectional view taken on line B11—B11, a cross-sectional view taken on line C11—C11, and a cross-sectional view taken on line D11—D11, respectively.

In FIG. 13, a reference numeral 115 designates a cathode terminal and others are the same as in FIG. 10.

Figure 14A:
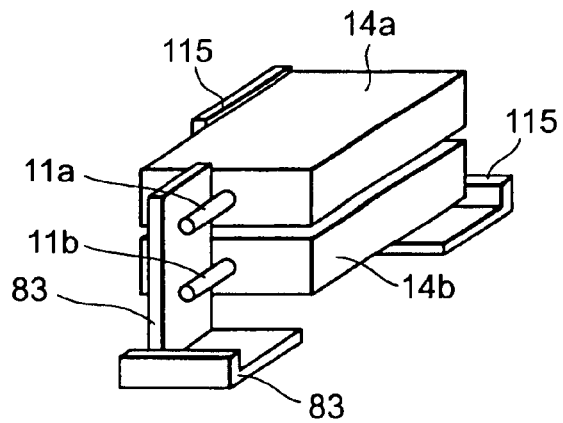
FIG. 14A is a perspective view of the solid electrolytic capacitor according to the sixth embodiment, viewed from the anode terminal side.
Figure 14B:
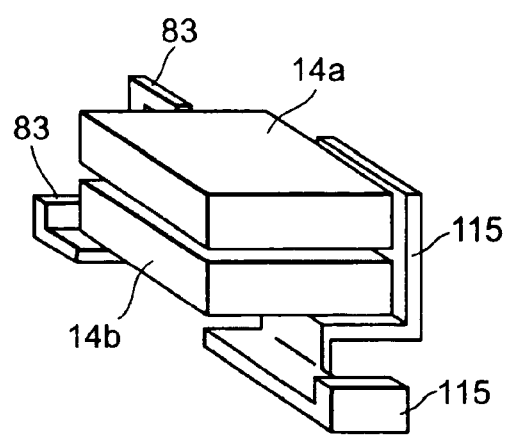
FIG. 14B is a perspective view of the solid electrolytic capacitor according to the sixth embodiment, viewed from the cathode terminal side.
Figure 14C:
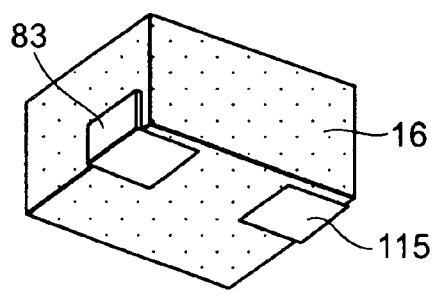
FIG. 14C is a perspective view of the solid electrolytic capacitor according to the sixth embodiment, viewed from below.

Referring to FIG. 14, there are shown perspective views of the solid electrolytic capacitor according to the sixth embodiment. FIG. 14A is a perspective diagram viewed from the anode terminal side. FIG. 14B is a perspective diagram viewed from the cathode terminal side. FIG. 14C is a perspective diagram viewed from below. Note that, however, exterior coating resin is omitted in FIG. 14A and FIG. 14B.

In the sixth embodiment, an anode terminal 83 is directly welded to anode leads 11a and 11b. A cathode terminal 115 is connected and fixed to a cathode layer by conductive adhesive in a rear face (one of the faces parallel to the lead-out direction of the anode leads of the capacitor elements and perpendicular to a bottom face thereof) and an end face (a face perpendicular to the lead-out direction of the anode leads and opposed to the anode leads) of capacitor elements 14a and 14b.

The following describes a method of manufacturing the solid electrolytic capacitor according to the sixth embodiment. A process of making the capacitor elements is the same as in the first embodiment.

Figure 15A:
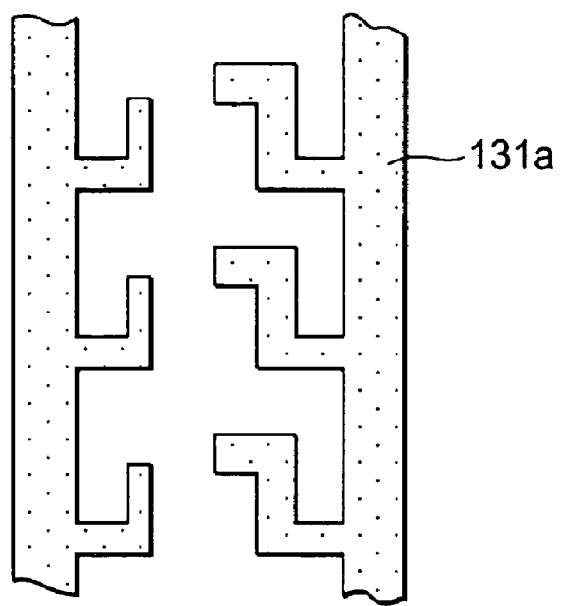
FIG. 15A is a top plan view of a lead frame not having been formed yet in the sixth embodiment.
Figure 15B:
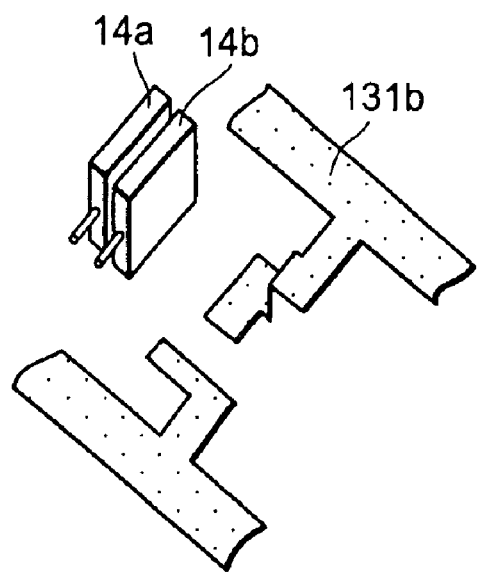
FIG. 15B is an exploded perspective view of a connection between a formed lead frame and a capacitor element.

Before connecting and fixing the obtained capacitor elements to the lead frame, a lead frame 131a shown in FIG. 15A is formed into a shape of a lead frame 131b shown in FIG. 15B. Then, the capacitor elements 14a and 14b are provided in a parallel arrangement sidewardly in a way that their thickness direction is a horizontal direction, thereafter connecting and fixing the anode leads by welding and a cathode layer by a conductive adhesive.

The subsequent processes are the same as those in the fifth embodiment and therefore the description is omitted here.

In the sixth embodiment, a terminal structure is provided without any anode connecting piece and it is easy to form the lead frame and to connect and fix the capacitor elements and further easy to form the terminals after they are cut and separated from the lead frame, thereby achieving a solid electrolytic capacitor superior in productivity and a method of manufacturing the same.

Referring to FIG. 27, there are shown anode welds of a solid electrolytic capacitor according to a seventh embodiment. Referring to FIG. 27A, there is shown a cross section of an anode connection in the case of using an anode terminal 253a. Referring to FIG. 27B, there is shown a cross section of an anode connection in the case of using an anode terminal 253b. Both are cross sections perpendicular to the lead-out direction of anode leads.

Figure 27A:
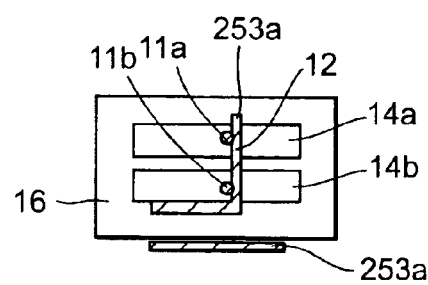
FIG. 27A is a cross-sectional view of an anode weld of a solid electrolytic capacitor according to a seventh embodiment.
Figure 27B:
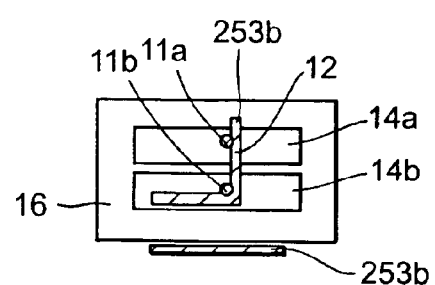
FIG. 27B is a cross-sectional view of an anode connection in which another anode terminal is used.
Figure 27C:
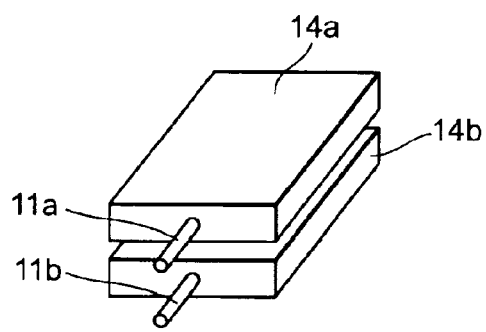
FIG. 27C is an exploded perspective view of an anode weld of the solid electrolytic capacitor according to the seventh embodiment.
Figure 27D:
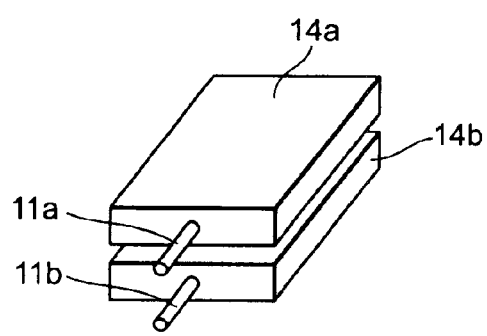
FIG. 27D is an exploded perspective view of the anode weld in which another anode terminal is used.

Referring to FIG. 27C, there is shown an exploded perspective view of an anode weld in the case of using an anode terminal 253a. Referring to FIG. 27D, there is shown an exploded perspective view of an anode weld in the case of using an anode terminal 253b. Exterior coating resin 16 is the same as in other embodiments.

As shown, in the seventh embodiment, the anode terminals 253a and 253b are bent at an angle of 90 degrees inside the exterior coating resin, too. These bends have already been made in the condition of a lead frame before welding anode leads 11a and 11b of capacitor elements 14a and 14b.

Moreover, the anode terminals 253a and 253b are bent along a side face and a bottom face of the exterior coating resin 16. Although the bending along the external surface of the exterior coating resin 16 is similar to that of the sixth embodiment, the terminals are bent first along the side face of the exterior coating resin 16 and then bent along the bottom face of the exterior coating resin 16 in the seventh embodiment. Shapes of the bends are the same as those in FIG. 3 referred to for the first embodiment.

On the other hand, a connecting structure of a cathode terminal is the same as in the first embodiment, though it is not shown here.

As shown, in the seventh embodiment, the anode terminal is bent at an end in the side of the anode leads along a bending line parallel to the anode leads inside the exterior coating resin 16.

Referring to FIG. 28, there are shown anode welds of a solid electrolytic capacitor according to an eighth embodiment. Referring to FIG. 28A, there is shown a cross section of the anode weld in the case of using an anode terminal 263a. Referring to FIG. 28B, there is shown a cross section of the anode weld in the case of using an anode terminal 263b. Both are cross sections perpendicular to the lead-out direction of the anode leads.

Figure 28A:
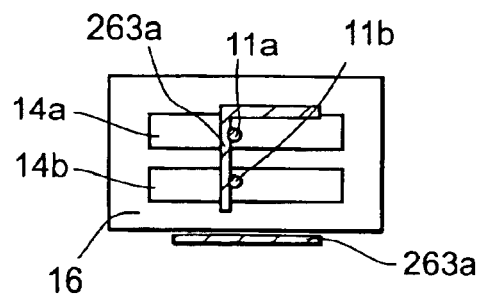
FIG. 28A is a cross-sectional view of an anode weld of a solid electrolytic capacitor according to an eighth embodiment.
Figure 28B:
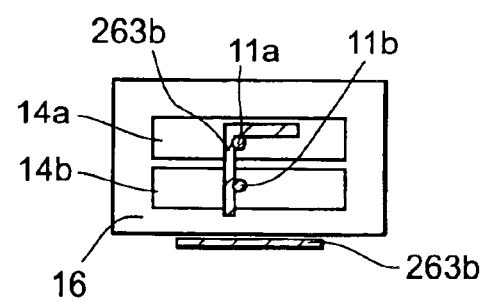
FIG. 28B is a cross-sectional view of an anode connection in which another anode terminal is used.
Figure 28C:
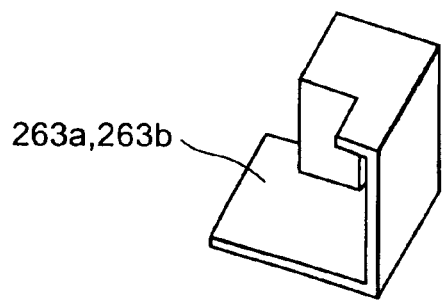
FIG. 28C is a perspective view showing an anode terminal of the solid electrolytic capacitor according to the eighth embodiment.
Figure 28D:
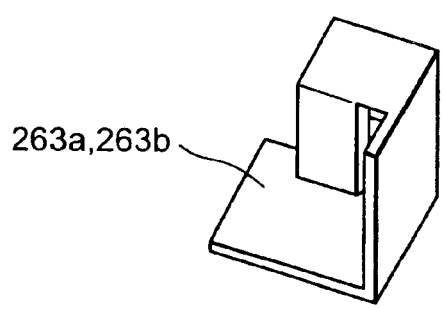
FIG. 28D is a perspective view showing another anode terminal of the solid electrolytic capacitor according to the eighth embodiment.

Furthermore, referring to FIG. 28C, there is shown a perspective view of the anode terminal 263a or 263b. Referring to FIG. 28D, there is shown a perspective view of the anode terminal 263a or 263b. Exterior coating resin 16 is the same as in FIG. 4 referred to for the second embodiment.

In the eighth embodiment, the anode terminals 263a and 263b are bent at an angle of 90 degrees inside the exterior coating resin 16, too. These bends have already been made in the condition of a lead frame before welding anode leads 11a and 11b of capacitor elements 14a and 14b.

Moreover, the anode terminals 263a and 263b are bent along an end face and a bottom face of the exterior coating resin 16. The bending along the external surface of the exterior coating resin 16 is the same as in the seventh embodiment.

On the other hand, a connecting structure of a cathode terminal is the same as in the second embodiment, though it is not shown here.

As shown, in the eighth embodiment, the anode terminal is bent at an end in the side of the anode leads along a bending line parallel to the anode leads inside the exterior coating resin 16.

The first to eighth embodiments described hereinabove are intended for a solid electrolytic capacitor having anode leads led out from one side of the anode body. The following describes ninth to 15 th embodiments for a solid electrolytic capacitor having anode leads penetrating through an anode body.

Referring to FIG. 16, there is shown a first solid electrolytic capacitor according to the ninth embodiment of the present invention. Referring to FIGS. 16A, 16B, 16C, 16D, and 16E, there are shown a cross-sectional view taken on line A14—A14, a cross-sectional view taken on line B14—B14, a cross-sectional view taken on line C14—C14, a cross-sectional view taken on line D14—D14, and a perspective view of a cathode terminal, respectively.

There are shown anode leads 141a and 141b, anode connecting pieces 142a and 142b, anode terminals 143a and 143b, capacitor elements 144a and 144b, a cathode terminal 145, and exterior coating resin 16.

The capacitor elements 144a and 144b used here differ from the capacitor elements 14a and 14b described in the first embodiment in that they have anode leads 141a and 141b penetrating through the anode body. These capacitor elements greatly reduce an equivalent series inductance (ESL) component that begins to have an effect in the high frequency domain (around 1 MHz) due to the transmission-line element shape. Description of an ESR component is the same as for the capacitor elements 14a and 14b described in the first embodiment.

Regarding a method of manufacturing a solid electrolytic capacitor in which manganese dioxide is used for a cathode layer, it has already been described in detail in the aforementioned second conventional technology, and the description is omitted here. A problem here is particularly to reduce an ESR. Therefore, the following briefly describes a method of manufacturing a solid electrolytic capacitor in which a conductive polymer is used for a cathode layer.

More specifically, the anode lead 141a or 141b, which is a metal wire having a valve action, is provided as a central conductor, and an anode body is formed as a sintered compact of metal powders having a valve action around the central conductor. An oxide film is then formed on a surface of the anode body. Subsequently, a solid electrolyte made of a conductive polymer is formed, and a graphite layer and a silver paste layer are formed further. Moreover, the anode terminals are connected to both ends of the anode leads, and the cathode terminal is connected to a surface of the silver paste of a cathode layer.

A connecting structure of the anode leads 141a and 141b, the anode connecting piece 142a, and the anode terminal 143a is the same as that of the anode in the first embodiment shown in FIG. 3. Furthermore, a connecting structure of the anode connecting piece 142b, the anode leads 141a and 141b, and the anode terminal 143b in the opposite side is the same as the first embodiment, too.

Figure 16A:
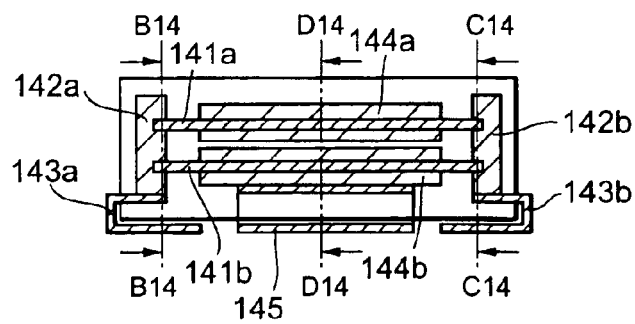
FIG. 16A is a cross-sectional view taken on line A14—A14 of FIG. 16B, showing a first solid electrolytic capacitor according to a ninth embodiment.
Figure 16B:
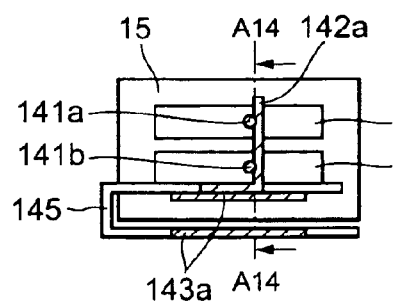
FIG. 16B is a cross-sectional view taken on line B14—B14 of FIG. 16A.
Figure 16C:
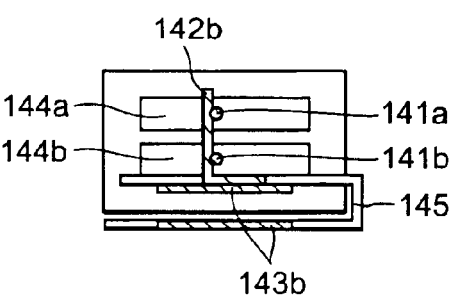
FIG. 16C is a cross-sectional view taken on line C14—C14 of FIG. 16A.
Figure 16E:
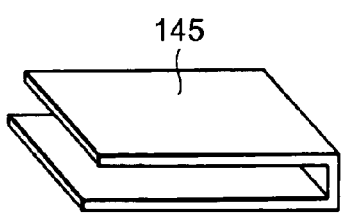
FIG. 16E is a perspective view of a cathode terminal.
Figure 16D:
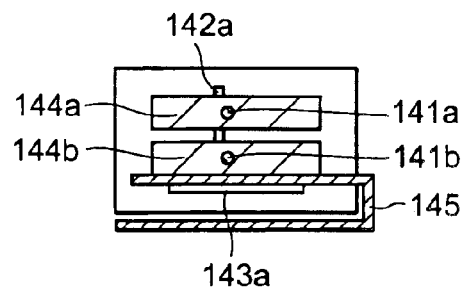
FIG. 16D is a cross-sectional view taken on line D14—D14 of FIG. 16A.

On the other hand, a shape of the cathode terminal 145 is as shown in FIG. 16E. It is connected to a bottom face of the capacitor element 144b by conductive adhesive. A bottom face of the capacitor element 144a is bonded to the top face of the capacitor element 144b by conductive adhesive.

Referring to FIG. 17, there is shown a second solid electrolytic capacitor having a cathode terminal of another shape. Referring to FIGS. 17A, 17B, 17C, 17D, and 17E, there are shown a cross-sectional view taken on line A15—A15, a cross-sectional view taken on line B15—B15, a cross-sectional view taken on line C15—C15, a cross-sectional view taken on line D15—D15, and a perspective view of the cathode terminal, respectively.

Figure 17A:
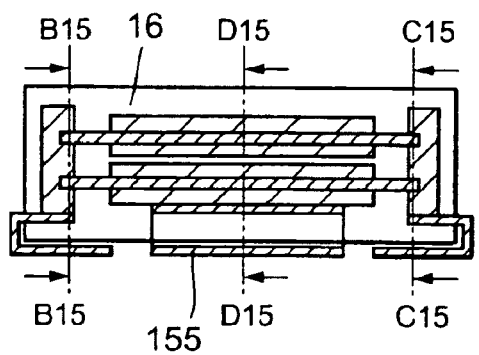
FIG. 17A is a cross-sectional view taken on line A15—A15 of FIG. 17B, showing a second solid electrolytic capacitor according to the ninth embodiment.
Figure 17B:
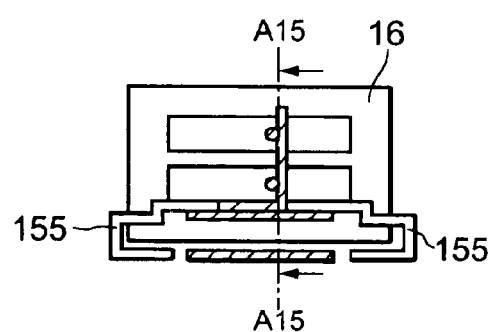
FIG. 17B is a cross-sectional view taken on line B15—B15 of FIG. 17A.
Figure 17C:
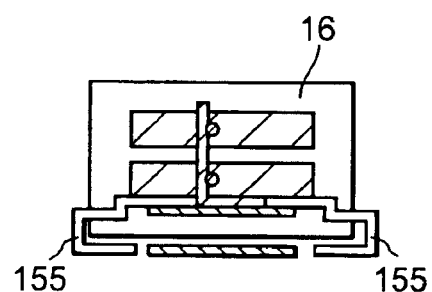
FIG. 17C is a cross-sectional view taken on line C15—C15 of FIG. 17A.
Figure 17D:
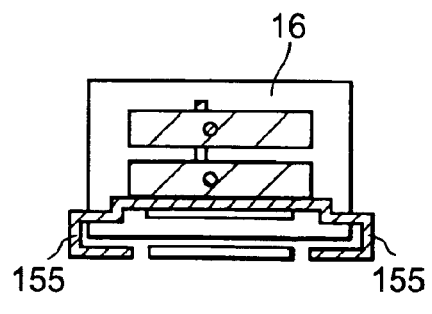
FIG. 17D is a cross-sectional view taken on line D15—D15 of FIG. 17A.
Figure 17E:
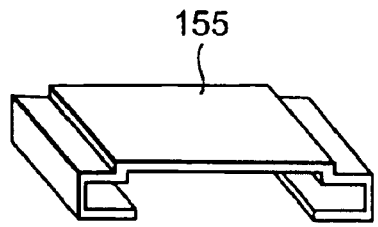
FIG. 17E is a perspective view of a cathode terminal.

The cathode terminal 155 has a configuration in which two parts of the external surface are exposed from the exterior coating resin as shown in FIG. 17B to FIG. 17D.

The solid electrolytic capacitor having two anode terminals as mentioned above can be favorably used as a transmission-line filter. An action of the solid electrolytic capacitor of this type is, for example, as disclosed in Japanese Unexamined Patent Publication (JP-A) No. 2002-335107.

In this application, it is also important to increase the capacitance by forming laminated capacitor elements in a small size. Therefore, the ninth embodiment is preferred.

Referring to FIG. 18, there is shown a solid electrolytic capacitor according to a tenth embodiment of the present invention. Referring to FIGS. 18A, 18B, 18C, 18D, and 18E, there are shown a cross-sectional view taken on line A16—A16, a cross-sectional view taken on line B16—B16, a cross-sectional view taken on line C16—C16, a cross-sectional view taken on line D16—D16, and a perspective view of a cathode terminal, respectively.

Figure 18A:
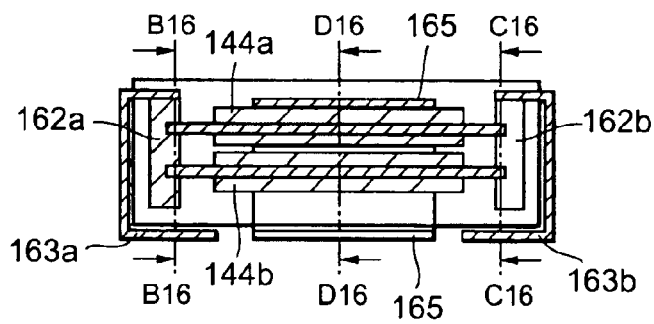
FIG. 18A is a cross-sectional view taken on line A16—A16 of FIG. 18B, showing a solid electrolytic capacitor according to a tenth embodiment.
Figure 18B:
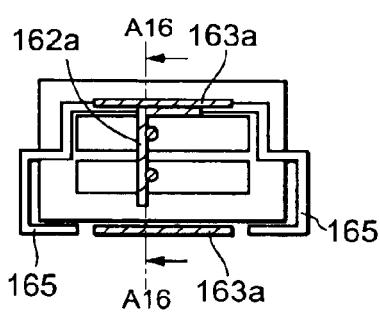
FIG. 18B is a cross-sectional view taken on line B16—B16 of FIG. 18A.
Figure 18C:
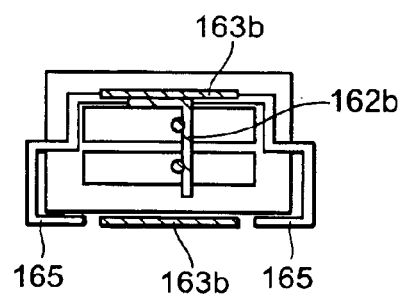
FIG. 18C is a cross-sectional view taken on line C16—C16 of FIG. 18A.
Figure 18E:
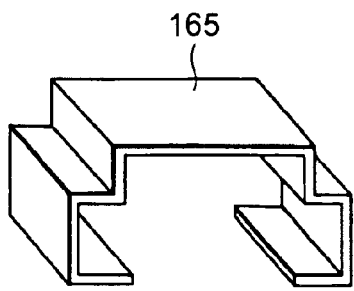
FIG. 18E is a perspective view of a cathode terminal.
Figure 18D:
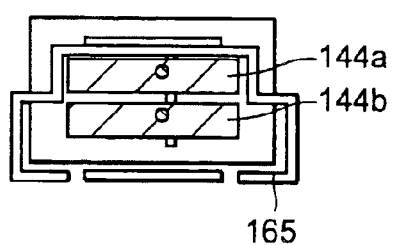
FIG. 18D is a cross-sectional view taken on line D16—D16 of FIG. 18A.

The cathode terminal 165 is as shown in FIG. 18E. While the cathode terminal 155 (See FIG. 17) in the ninth embodiment is connected to the cathode layer at the bottom face of the capacitor element 144b laminated in the lower side, the cathode terminal 165 is connected to a cathode layer at a top face of a capacitor element 144a laminated in the upper side in the tenth embodiment.

An 11th embodiment corresponds to the third embodiment in the combination of the anode connecting piece and the anode terminal. This embodiment differs from the third embodiment in that anode terminals are provided in two side faces. A shape of a cathode terminal can be the same as in the ninth or tenth embodiment.

Figure 19A:
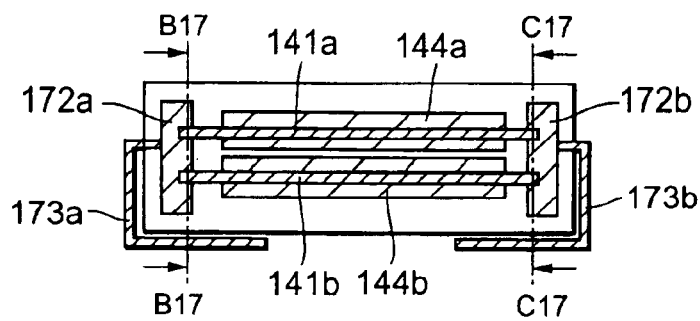
FIG. 19A is a cross-sectional view taken on line A17—A17 of FIG. 19B, showing a first solid electrolytic capacitor according to an 11th embodiment.
Figures 19B, 19C:
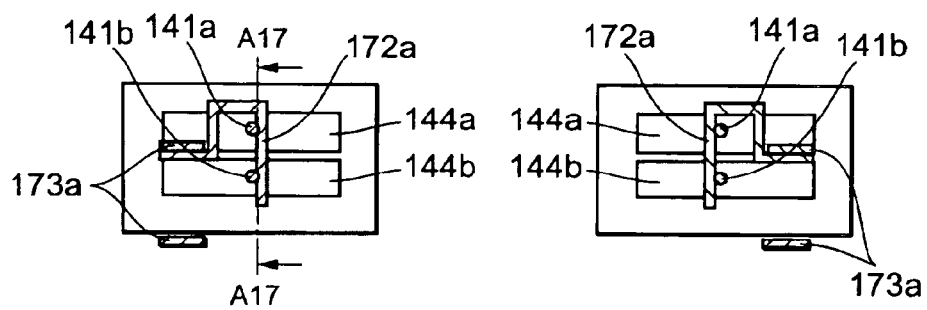
FIG. 19B is a cross-sectional view taken on line B17—B17 of FIG. 19A.
FIG. 19C is a cross-sectional view taken on line C17—C17 of FIG. 19A.
Figure 19D:
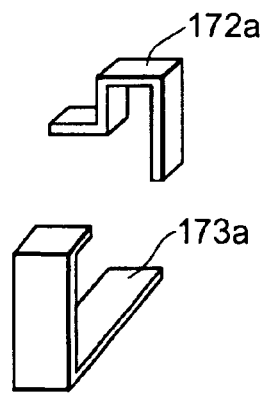
FIG. 19D is a perspective view of an anode connecting piece and an anode terminal.

Referring to FIG. 19, there is shown a first solid electrolytic capacitor according to the 11th embodiment. Referring to FIGS. 19A, 19B, 19C, and 19D, there are shown a cross-sectional view taken on line A17—A17, a cross-sectional view taken on line B17—B17, a cross-sectional view taken on line C17—C17, and a perspective view of an anode connecting piece and an anode terminal. Note that, however, the cathode terminal is not shown here.

Anode connecting pieces 172a and 172b have the same shape as that of the anode connecting piece 32 (See FIG. 5) in the third embodiment. An anode terminal 173a has the same shape as that of the anode terminal 33 (See FIG. 5) in the third embodiment.

Referring to FIG. 20, there are shown diagrams of second to fifth solid electrolytic capacitors according to the 11th embodiment. Referring to FIG. 20A, there is shown a perspective view of an anode connecting piece 182a and an anode terminal 183a each having another shape. Referring to FIGS. 20B and 20C, there are shown schematic diagrams each illustrating an anode weld of a solid electrolytic capacitor using the anode connecting piece 182a and the anode terminal 183a shown in FIG. 20A.

Figure 20A:
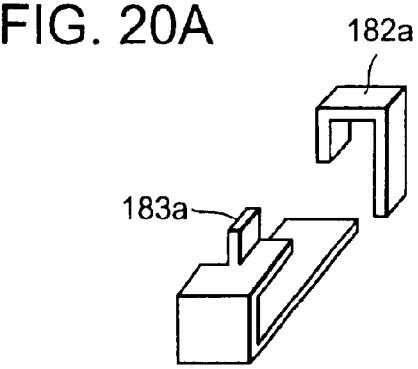
FIGS. 20A and 20D are perspective views showing an anode connecting piece and an anode terminal of second to fifth solid electrolytic capacitors according to the 11th embodiment.
Figure 20B:
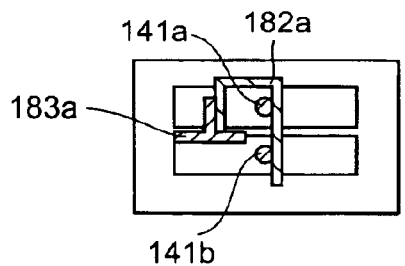
FIGS. 20B, 20C, 20E, and 20F are schematic diagrams showing an anode weld.
Figure 20C:
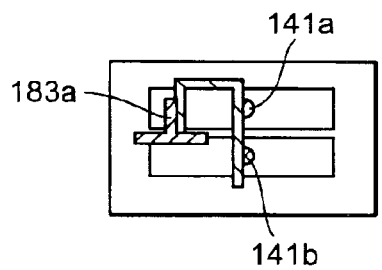
Figure 20D:
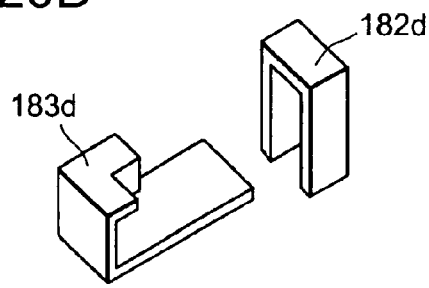
Figure 20E:
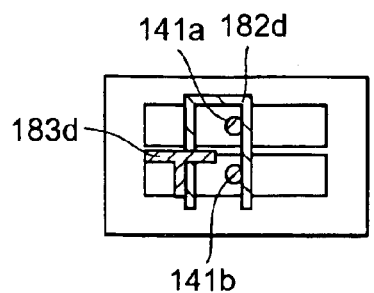
Figure 20F:
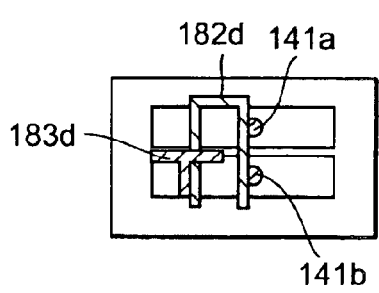
Figure 21A:
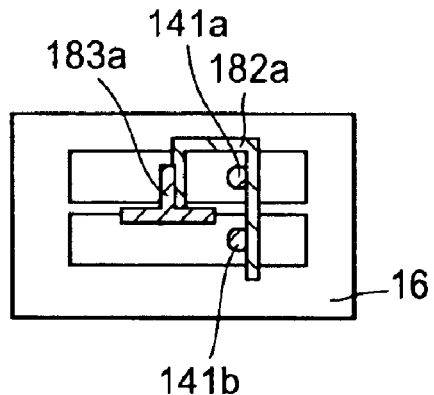
FIGS. 21A, 21B, 21C, and 21D are schematic diagrams showing an anode weld of sixth to ninth solid electrolytic capacitors according to the 11th embodiment.
Figure 21B:
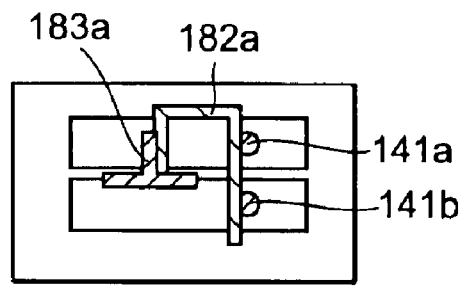
Figure 21C:
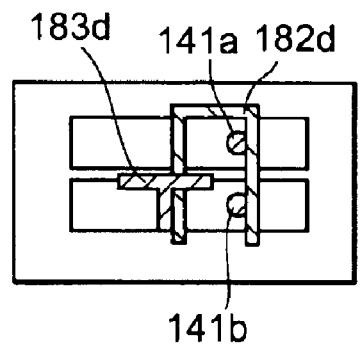
Figure 21D:
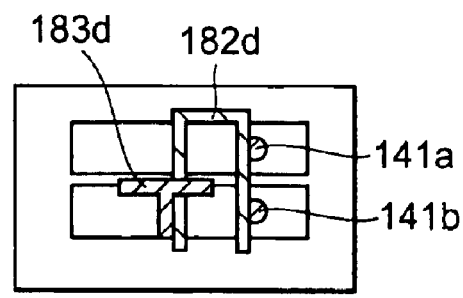
Figure 22A:
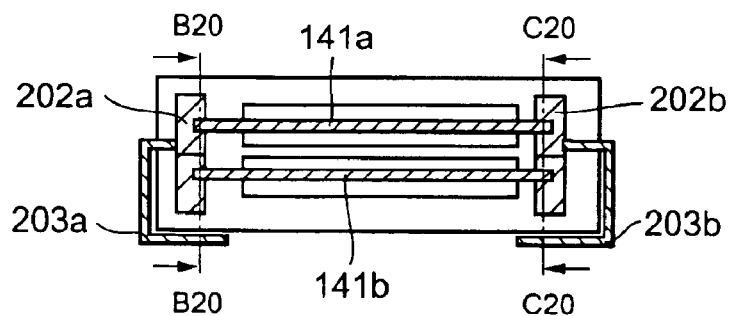
FIG. 22A is a cross-sectional view taken on line A20—A20 of FIG. 22B, showing a first solid electrolytic capacitor according to a 12th embodiment.
Figure 22B:
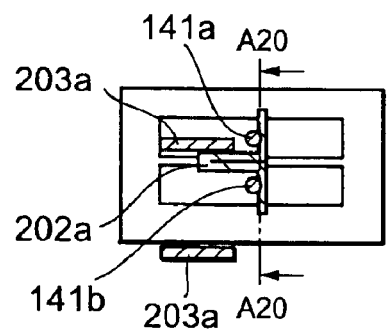
FIG. 22B is a cross-sectional view taken on line B20—B20 of FIG. 22A.
Figure 22C:
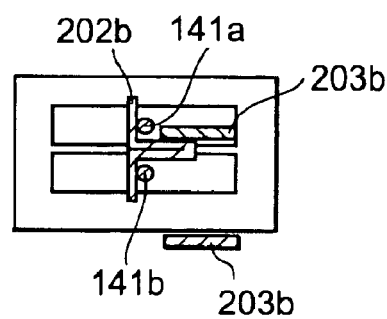
FIG. 22C is a cross-sectional view taken on line C20—C20 of FIG. 22A.
Figure 22D:
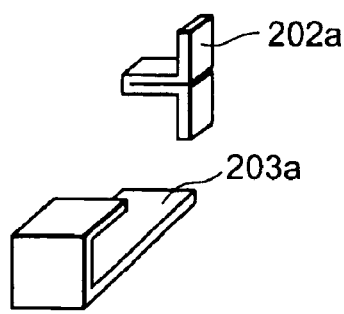
FIG. 22D is a perspective view of an anode connecting piece and an anode terminal.

Referring to FIG. 20D, there is shown a perspective view illustrating an anode connecting piece 182d and an anode terminal 183d each having still another shape (horseshoe-shape) in the 11th embodiment. Referring to FIGS. 20E and 20F, there are shown schematic diagrams each illustrating an anode weld of a solid electrolytic capacitor using the anode connecting piece 182d and the anode terminal 183d shown in FIG. 20D.

Referring to FIG. 21, there are shown schematic diagrams of anode welds of sixth to ninth solid electrolytic capacitors according to the 11th embodiment, in the case of using capacitor elements having anode leads led out to be eccentric away from the center of the capacitor elements. Referring to FIGS. 21A and 21B, there are shown diagrams in the case of using the anode connecting piece 182a and the anode terminal 183a shown in FIG. 20A. Referring to FIGS. 21C and 21D, there are shown diagrams in the case of using the anode connecting piece 182d and the anode terminal 183d shown in FIG. 20D.

Referring to FIG. 22, there is shown a first solid electrolytic capacitor according to a 12th embodiment of the present invention. Referring to FIGS. 22A, 22B, 22C, and 22D, there are shown a cross-sectional view taken on line A20—A20, a cross-sectional view taken on line B20—B20, a cross-sectional view taken on line C20—C20, and a perspective view of an anode connecting piece and an anode terminal, respectively.

The 12th embodiment corresponds to the fourth embodiment in the combination of the anode connecting piece and the anode terminal. This embodiment differs from the fourth embodiment in that anode terminals are provided in two side faces. In FIG. 22, reference numerals 202a and 202b designate anode connecting pieces and reference numerals 203a and 203b designate anode terminals. Although a cathode terminal is not shown here, a shape of the cathode terminal can be the same as in the ninth or tenth embodiment (See FIG. 16, FIG. 17, or FIG. 18).

Figure 23A:
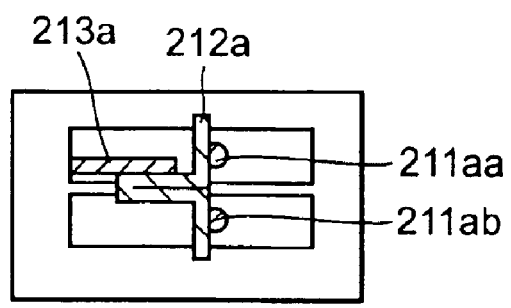
FIGS. 23A, 23B, and 23C are schematic diagrams showing an anode weld of second to fourth solid electrolytic capacitors according to the 12th embodiment.
Figure 23B:
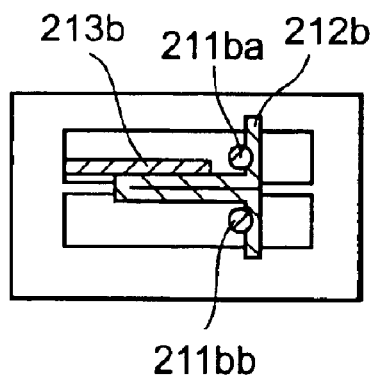
Figure 23C:
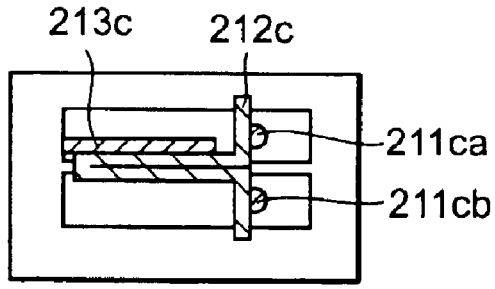
Figure 24A:
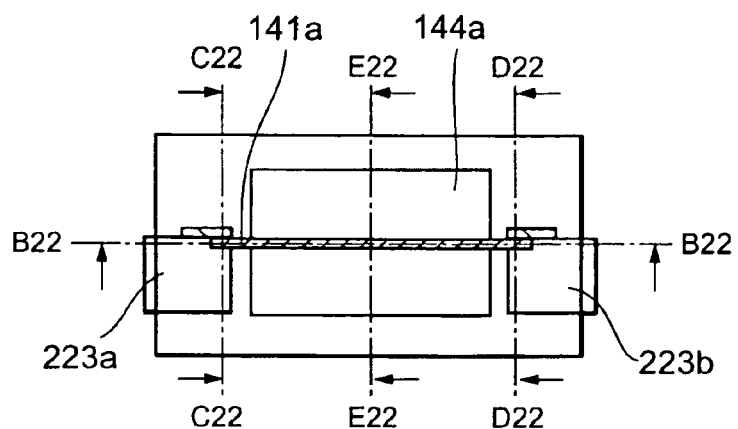
FIG. 24A is a cross-sectional view taken on line A22—A22 of FIG. 24B, showing a solid electrolytic capacitor according to a 13th embodiment.
Figure 24B:
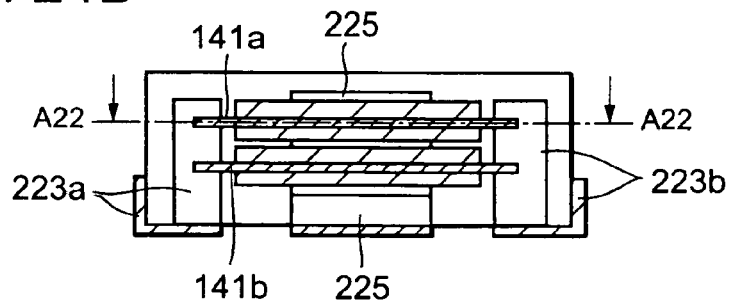
FIG. 24B is a cross-sectional view taken on line B22—B22 of FIG. 24A.
Figure 24C:
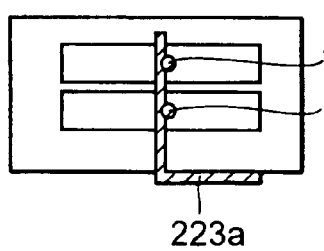
FIG. 24C is a cross-sectional view taken on line C22—C22 of FIG. 24A.
Figure 24D:
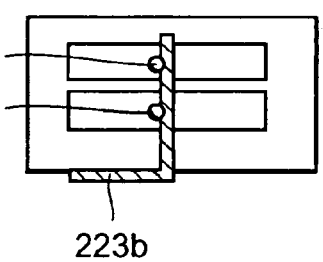
FIG. 24D is a cross-sectional view taken on line D22—D22 of FIG. 24A.
Figure 24E:
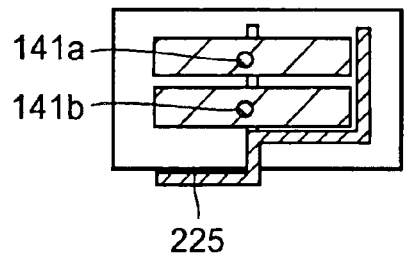
FIG. 24E is a cross-sectional view taken on line E22—E22.

Subsequently, referring to FIG. 23, there are shown schematic diagrams of anode welds of second to fourth solid electrolytic capacitors according to the 12th embodiment, in the case of using capacitor elements having anode leads led out to be eccentric away from the center of the capacitor elements. The anode welds shown in FIG. 23A, FIG. 23B, and FIG. 23C have the shapes corresponding to the anode welds shown in FIG. 9A, FIG. 9B, and FIG. 9C. In these diagrams, there are shown anode leads 211aa, 211ab, 211ba, 211bb, 211ca, and 211cb, anode connecting pieces 212a, 212b, and 212c, and anode terminals 213a, 213b, and 213c.

Referring to FIG. 24, there is shown a solid electrolytic capacitor according to a 13th embodiment of the present invention. Referring to FIGS. 24A, 24B, 24C, 24D, and 24D, there are shown a cross-sectional diagram taken on line A22—A22, a cross-sectional diagram taken on line B22—B22, a cross-sectional diagram taken on line C22—C22, a cross-sectional diagram taken on line D22—D22, and a cross-sectional diagram taken on line E22—E22, respectively.

In FIG. 24, there are shown anode terminals 223a and 223b and a cathode terminal 225.

Furthermore, referring to FIG. 25, there are shown perspective views of the solid electrolytic capacitor according to the 13th embodiment. Referring to FIG. 25A, there is shown a perspective diagram viewed from the first anode terminal side. Referring to FIG. 25B, there is shown a perspective diagram viewed from the second anode terminal side. Referring to FIG. 25D, there is shown a perspective diagram viewed from below. Note that, however, exterior coating resin is omitted in FIG. 25A and FIG. 25B.

In the 13th embodiment, the anode terminal 223a is directly welded to protrusions in one side of anode leads 141a and 141b. The anode terminal 223b is directly welded to protrusions in the other side of the anode leads 141a and 141b. The cathode terminal 225 is connected and fixed to a cathode layer by conductive adhesive in a rear face (one of the faces parallel to the lead-out direction of the anode leads of the capacitor elements and perpendicular to the bottom face) of the capacitor elements 144a and 144b and in the under surface of the capacitor element 144b.

Figure 25A:
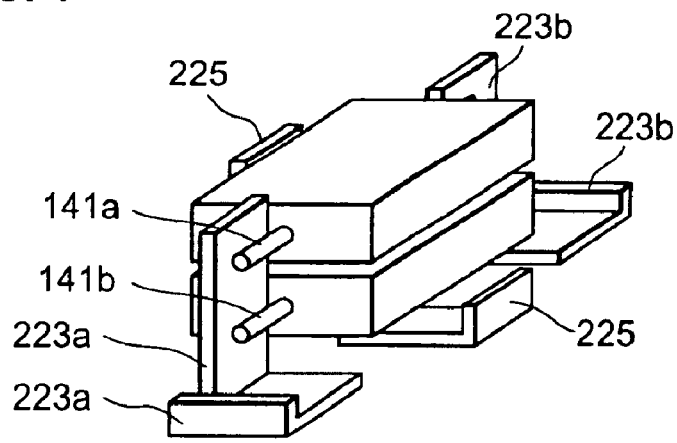
FIG. 25A is a perspective view of the solid electrolytic capacitor according to the 13th embodiment, viewed from the first anode terminal side.
Figure 25B:
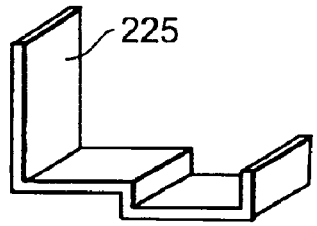
FIG. 25B is a perspective view showing a cathode terminal.
Figure 25C:
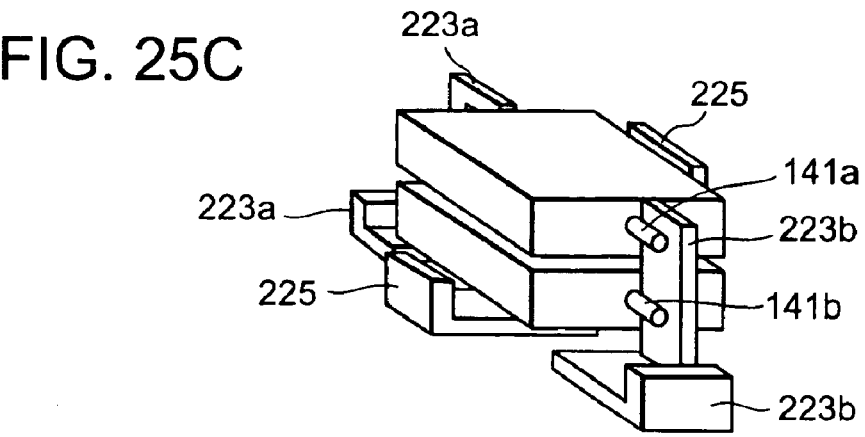
FIG. 25C is a perspective view of the solid electrolytic capacitor according to the 13th embodiment, viewed from the second anode terminal side.
Figure 25D:
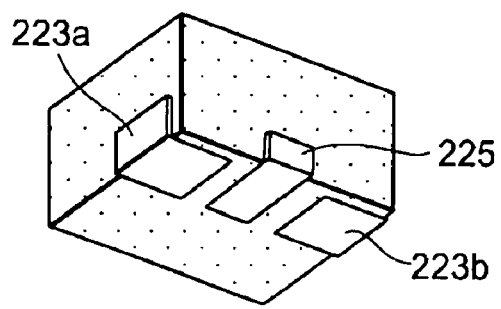
FIG. 25D is a perspective view of the solid electrolytic capacitor according to the 13th embodiment, viewed from below.

Furthermore, as shown in FIG. 25D, the anode terminals 223a and 223b are exposed from the exterior coating resin 16 in the bottom face and side faces, and the cathode terminal 225 is exposed from the exterior coating resin 16 in the bottom face, the front face, and the rear face.

A method of manufacturing the solid electrolytic capacitor according to the 13th embodiment is substantially the same as the manufacturing method in the fifth or sixth embodiment. It should be noted, however, that the solid electrolytic capacitor has a structure in which the cathode terminal is provided between the two anode terminals in the 13th embodiment and thereby a lead frame to be used therefor is shaped as shown in FIG. 26.

Figure 26A:
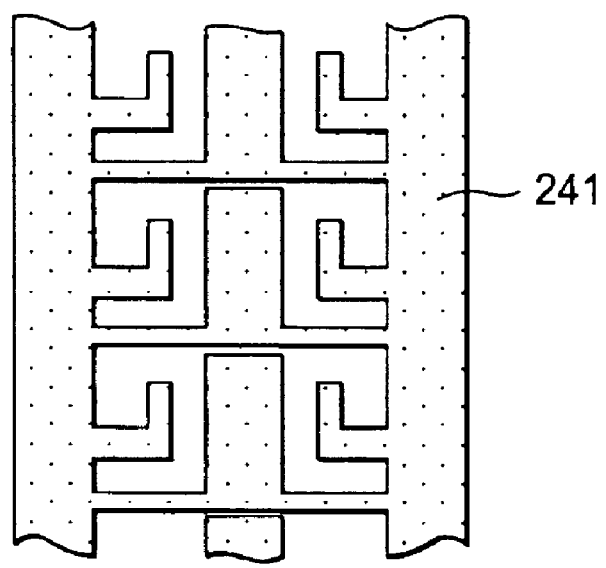
FIG. 26A is a top plan view of a lead frame not having been formed yet in the 13th embodiment.
Figure 26B:
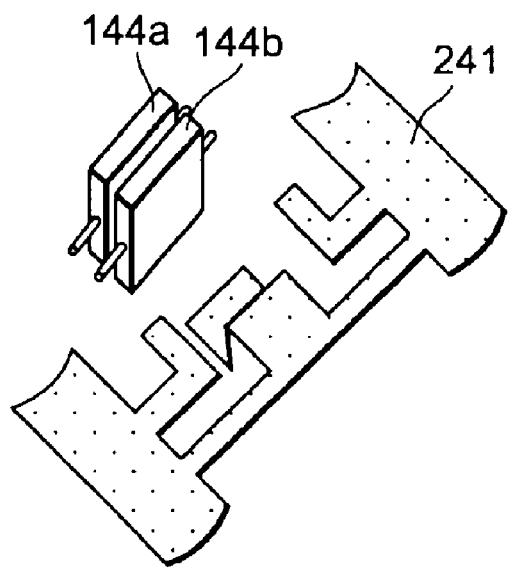
FIG. 26B is an exploded perspective view of a connection between a formed lead frame and a capacitor element.

Referring to FIG. 26, there are shown explanatory diagrams for a connection of the capacitor elements with the lead frame. Referring to FIG. 26A, there is shown a top plan view of the lead frame before forming. Referring to FIG. 26B, there is shown an exploded perspective view of a connection between a formed lead frame and the capacitor elements.

The lead frame 241 is previously formed and then the capacitor elements are connected to it. Thereafter, they are molded in resin and the molded body is cut and separated from the lead frame. The terminals are then formed by bending at an angle of 90 degrees, thereby achieving the solid electrolytic capacitor according to the 13th embodiment.

A 14th embodiment is another embodiment of a solid electrolytic capacitor having anode leads penetrating through an anode body, which is the same as the ninth embodiment except its anode welds. The anode welds are the same as in the seventh embodiment. Therefore, this embodiment is described by referring to FIG. 16, FIG. 17, and FIG. 27 used for the description of the embodiments.

An anode terminal in the 14th embodiment has the same shape as the anode terminal 253*a* or 253*b* in FIG. 27. In other words, an anode connecting piece is not used, but anode leads are directly welded to the anode terminal. The anode terminals are bent at an angle of 90 degrees along a bending line parallel to the lead-out direction of the anode leads inside exterior coating resin.

Furthermore, the anode terminals are bent along the side faces and the bottom face of the exterior coating resin 16.

On the other hand, a cathode terminal is the same as one of the cathode terminal 145 in FIG. 16, the cathode terminal 155 in FIG. 17, and the cathode terminal 165 in FIG. 18.

Since the solid electrolytic capacitor has the above structure, its manufacturing method is the same as the seventh embodiment regarding the anode welds and the same as the ninth embodiment regarding other portions.

A 15th embodiment is still another embodiment of a solid electrolytic capacitor having anode leads penetrating through an anode body, which is the same as the tenth embodiment except its anode welds. The anode welds are the same as in the eighth embodiment. Therefore, this embodiment is described by referring to FIG. 18 and FIG. 28 used for the description of the embodiments.

An anode terminal in the 15th embodiment has the same shape as that of the anode terminal 263*a* or 263*b* in FIG. 28. In other words, an anode connecting piece is not used, but anode leads are directly welded to the anode terminal. The anode terminals are bent at an angle of 90 degrees along a bending line parallel to the lead-out direction of the anode leads inside exterior coating resin.

Furthermore, the anode terminals are bent along the side faces and the bottom face of the exterior coating resin 16.

On the other hand, a cathode terminal is the same as one of the cathode terminal 145 in FIG. 16, the cathode terminal 155 in FIG. 17, and the cathode terminal 165 in FIG. 18.

Also with the aforementioned terminal structure, a solid electrolytic capacitor having two anode terminals in both sides of anode leads penetrating an anode body can have a terminal structure in which the anode leads are directly welded to the anode terminals.

As set forth hereinabove, according to the present invention, it is possible to provide a solid electrolytic capacitor having a low ESR and a large capacity in a high frequency domain, a thin-type external appearance, and a terminal structure superior in productivity and a method of manufacturing the same.

Furthermore, also for an application as a transmission-line noise filter with a parallel connection of the capacitor elements having two anode terminals in both sides of anode leads penetrating through the inside, it is possible to provide a solid electrolytic capacitor having a low impedance and a terminal structure superior in productivity and a method of manufacturing the same.

Although the present invention has been shown and described in conjunction with the preferred embodiments thereof, it should be understood by those skilled in the art that the present invention is not limited to the foregoing description but may be changed and modified in various other manners without departing from the spirit and scope of the present invention as set forth in the appended claims.

What is claimed is:

1. A solid electrolytic capacitor comprising at least two capacitor elements using a valve action metal and laminated in a direction perpendicular to a mounting surface of a substrate, wherein said capacitor elements have a width parallel to the mounting surface of the substrate greater than a thickness perpendicular to the mounting surface of the substrate, and an anode terminal is connected with anode leads led out to at least one side of an anode body made of the valve action metal generally in parallel to the mounting surface of the substrate; and wherein a cathode layer on a dielectric oxide film of said anode body is connected to a cathode terminal and is coated with exterior coating resin with a part of said anode terminal and a part of said cathode terminal exposed.

2. The capacitor according to claim 1, wherein:

said valve action metal is tantalum or niobium.

3. The capacitor according to claim 1, wherein:

said capacitor elements have anode leads led out from one side of said anode body made of the valve action metal and said anode leads is connected to a single anode terminal.

4. The capacitor according to claim 1, wherein:

said capacitor elements have anode leads penetrating through said anode body made of the valve action metal and both ends of said anode leads are connected to independent anode terminals.

5. The capacitor according to claim 1, wherein:

an anode connecting piece is welded between said anode terminal and said anode leads.

6. The capacitor according to claim 5, wherein:

said anode connecting piece is L-shaped.

7. The capacitor according to claim 5, wherein:

said anode connecting piece is horseshoe-shaped.

8. The capacitor according to claim 7, wherein:

said anode connecting piece has rectangular portions having different lengths at both ends of the three rectangular portions forming the horseshoe shape.

9. The capacitor according to claim 8, wherein:

said anode connecting piece has one of the rectangular portions at both ends further bent outwardly at an angle of 90 degrees among the three rectangular portions formed by bending a strip into a horseshoe shape.

10. The capacitor according to claim 5, wherein:

said anode connecting piece has a twofold portion formed by bending the strip in the center at an angle of 90 degrees, 180 degrees, and 90 degrees again in this order.

11. The capacitor according to claim 7, wherein:

said anode terminal is bent at one side of the end portion inside said exterior coating resin at an angle of 90 degrees around a bending line parallel to the anode leads.

12. The capacitor according to claim 3, wherein:
said anode leads are directly welded to said anode terminal.

13. The capacitor according to claim 12, wherein:
said anode terminal is planar inside the exterior coating resin, bent along a surface of the exterior coating resin in a bottom face, which is the mounting surface of the substrate, and further bent along a surface of the exterior coating resin in a side face, which is an external surface substantially perpendicular to the lead-out direction of the anode leads.

14. The capacitor according to claim 12, wherein:
said anode terminal is bent to an angle of substantially 90 degrees along a bending line parallel to the lead-out direction of the anode leads inside the exterior coating resin, bent along a surface of the exterior coating resin in a side face, which is an external surface substantially perpendicular to the leadout direction of the anode leads, and further bent along a surface of the exterior coating resin in the bottom face, which is the mounting surface of the substrate.

15. The capacitor according to claim 12, wherein:
said cathode terminal is connected to the cathode layer in a front or rear face of said capacitor elements, parallel to the lead-out direction of the anode leads of said capacitor elements and perpendicular to a bottom face and further in an end face perpendicular to the lead-out direction of said anode leads and opposed to said anode leads.

16. The capacitor according to claim 12, wherein:
said cathode terminal is connected to the cathode layer in the front or rear face parallel to the lead-out direction of the anode leads of said capacitor elements and perpendicular to the bottom face thereof and in the bottom face of the capacitor elements.

17. The capacitor according to claim 4, wherein:
said anode leads are directly welded to said anode terminal.

18. The capacitor according to claim 17, wherein:
said anode terminal is planar inside the exterior coating resin, bent along a surface of the exterior coating resin in a bottom face, which is the mounting surface of the substrate, and further bent along a surface of the exterior coating resin in a side face, which is an external surface substantially perpendicular to the lead-out direction of the anode leads.

19. The capacitor according to claim 17, wherein:
said anode terminal is bent to an angle of substantially 90 degrees along the bending line parallel to the lead-out direction of said anode leads inside the exterior coating resin, bent along a surface of the exterior coating resin in the bottom face, which is the mounting surface of the substrate, and further bent along a surface of the exterior coating resin in the side face, which is an external surface substantially perpendicular to the lead-out direction of the anode leads.

20. The capacitor according to claim 17, wherein:
said cathode terminal is connected to the cathode layer in the front or rear face of said capacitor elements and in the bottom face of one of said capacitor elements.

21. The capacitor according to claim 17, wherein:
said cathode terminal is connected to the cathode layer in a top face of one of said capacitor elements.

22. The capacitor according to claim 17, wherein: said cathode terminal is connected to the cathode layer in a bottom face of one of said capacitor elements.

23. A method of manufacturing a solid electrolytic capacitor, in which anode leads are led out from an anode body made of a valve action metal and in which capacitor elements having a cathode layer formed on a dielectric oxide film of the anode body are laminated in a direction perpendicular to a mounting surface of a substrate and electrically connected in parallel, the method comprising the steps of:
forming a cathode terminal forming section of a lead frame;
providing a plurality of capacitor elements in a parallel arrangement in a way that a bottom face to be parallel to a mounting surface of a substrate at mounting is perpendicular to a surface of the lead frame, welding the anode leads of the capacitor elements to the anode terminal forming section of the lead frame, and connecting the cathode layer to the cathode terminal forming section;
molding the capacitor elements connected in the parallel arrangement in exterior coating resin;
cutting and separating the molded body from the lead frame; and
bending the anode terminal and the cathode terminal separated from the lead frame at an angle of 90 degrees along the exterior coating resin in the side face and the bottom face for formation.

24. The method of manufacturing a solid electrolytic capacitor according to claim 23, wherein:
said valve action metal is tantalum or niobium.

25. The capacitor according to claim 2, wherein:
an anode connecting piece is welded between said anode terminal and said anode leads.

26. The capacitor according to claim 3, wherein:
an anode connecting piece is welded between said anode terminal and said anode leads.

27. The capacitor according to claim 4, wherein:
an anode connecting piece is welded between said anode terminal and said anode leads.

28. The capacitor according to claim 8, wherein:
said anode terminal is bent at one side of the end portion inside said exterior coating resin at an angle of 90 degrees around a bending line parallel to the anode leads.

29. The capacitor according to claim 13, wherein:
said cathode terminal is connected to the cathode layer in a front or rear face of said capacitor elements, parallel to the lead-out direction of the anode leads of said capacitor elements and perpendicular to a bottom face and further in an end face perpendicular to the lead-out direction of said anode leads and opposed to said anode leads.

30. The capacitor according to claim 14, wherein:
said cathode terminal is connected to the cathode layer in a front or rear face of said capacitor elements, parallel to the lead-out direction of the anode leads of said capacitor elements and perpendicular to a bottom face and further in an end face perpendicular to the lead-out direction of said anode leads and opposed to said anode leads.

31. The capacitor according to claim 13, wherein:
said cathode terminal is connected to the cathode layer in the front or rear face parallel to the lead-out direction of the anode leads of said capacitor elements and perpendicular to the bottom face thereof and in the bottom face of the capacitor elements.

32. The capacitor according to claim 14, wherein:
said cathode terminal is connected to the cathode layer in the front or rear face parallel to the lead-out direction of the anode leads of said capacitor elements and perpendicular to the bottom face thereof and in the bottom face of the capacitor elements.

33. The capacitor according to claim 18, wherein:
said cathode terminal is connected to the cathode layer in the front or rear face of said capacitor elements and in the bottom face of one of said capacitor elements.

34. The capacitor according to claim 19, wherein:
said cathode terminal is connected to the cathode layer in the front or rear face of said capacitor elements and in the bottom face of one of said capacitor elements.

35. The capacitor according to claim 18, wherein:
said cathode terminal is connected to the cathode layer in a top face of one of said capacitor elements.

36. The capacitor according to claim 17, wherein:
said cathode terminal is connected to the cathode layer in a top face of one of said capacitor elements.

37. The capacitor according to claim 18, wherein:
said cathode terminal is connected to the cathode layer in a bottom face of one of said capacitor elements.

38. The capacitor according to claim 19, wherein:
said cathode terminal is connected to the cathode layer in a bottom face of one of said capacitor elements.

* * * * *